United States Patent [19]

Yoshida et al.

[11] Patent Number: 5,520,933
[45] Date of Patent: May 28, 1996

[54] METHOD FOR THE PRODUCTION OF FOODS AND BEVERAGES

[75] Inventors: Nobuko Yoshida, Ami-machi; Nobuo Ogata, Tsuchiura; Makoto Egi, Ami-machi; Hideo Muromachi, Tsuchiura; Yoichi Koiwa, Ushiku; Shigenori Ohta, Komae, all of Japan

[73] Assignee: Kyowa Hakko Kogyo Co., Ltd., Tokyo, Japan

[21] Appl. No.: 84,274

[22] PCT Filed: Nov. 12, 1992

[86] PCT No.: PCT/JP92/01481

§ 371 Date: Jul. 8, 1993

§ 102(e) Date: Jul. 8, 1993

[87] PCT Pub. No.: WO93/09681

PCT Pub. Date: May 27, 1993

[30] Foreign Application Priority Data

Nov. 12, 1991 [JP] Japan ..................... 3-295955
May 7, 1992 [JP] Japan ..................... 4-114859

[51] Int. Cl.⁶ .............. A23B 4/00; A23L 1/00
[52] U.S. Cl. .............. 426/7; 426/11; 426/18; 426/32; 426/33; 426/34; 426/44; 426/47; 426/49; 426/55; 426/60
[58] Field of Search ................ 426/7, 33, 35, 426/11, 12, 18, 20, 34, 61, 62, 32, 33, 34, 35, 44, 47, 49, 55, 60, 874, 580, 589, 590, 592, 615

[56] References Cited

U.S. PATENT DOCUMENTS 3,469,993  9/1969  Pangier ..................... 426/35
4,595,594  6/1986  Lee et al. ..................... 426/35

FOREIGN PATENT DOCUMENTS 0064855  5/1982  European Pat. Off. .
0170243  7/1985  European Pat. Off. .
2202266  1/1972  Germany .
47-14369  8/1972  Japan .
52-39904  12/1974  Japan .
56-50554  5/1976  Japan .
63-39233  4/1983  Japan .
58-116689  7/1983  Japan .
59-66856  4/1984  Japan .
59-113869  6/1984  Japan .
60-98959  6/1985  Japan .
62-130661  6/1987  Japan .
63-105652  5/1988  Japan .

OTHER PUBLICATIONS

Margalith, Flavor Microbiology, 1982, Charles C. Thomas, Springfield USA, pp. 76–79.
Parliment, et al. Biogeneration of Aromas, 1985, ACS Symposium Series, pp. 315–318.
Journal of the Japanese Society for Food Science and Technology, vol. 30, No. 10, p. 572 (1983).
J. Inst. Brew., 82, 170 (1976).
Hakko Kogaku Kaishi, 64, 175 (1986).
Hakko Kogaku Kaishi, 64, 247 (1986).
Tr. Tashk Politekh. Inst., 107, 94, (1973).
Izv. Akad. Nauk Mold. SSR. Ser. Biol. Khim. Nauk., 2, 78, (1975).
J. Dairy Sci., 57, 1432, (1974).
J. Dairy Sci. 57, 535 (1974).
Am. Chem. J. 24, 491, (1990).
Science, 224, 1249, (1984).

*Primary Examiner*—Leslie Wong
*Attorney, Agent, or Firm*—Antonelli, Terry, Stout & Kraus

[57] ABSTRACT

The present invention relates to a method for producing foods and beverages having a desirable flavor which comprises bringing an animal-derived, ethyl butyrate-synthesizing enzyme having a potency in the range of 0.1 unit/mg protein or higher under the conditions that ethyl butyrate is formed by reacting 0.5% (w/w) ethanol with 2.6% (w/w) butyric acid, or a substance containing the enzyme into contact with the foods and beverages during their production process.

9 Claims, 2 Drawing Sheets

METHOD FOR THE PRODUCTION OF FOODS AND BEVERAGES

TECHNICAL FIELD

The present invention relates to a method for the production of foods and beverages with a desirable flavor, particularly an ester flavor which comprises bringing an animal-derived, ester-synthesizing enzyme or a substance containing the enzyme into contact with the foods and beverages at its production stage to thereby impart an ester flavor to the foods and beverages.

PRIOR ART

A large number of aromatic components are identified in food products. Out of the components, an ester flavor is well known as a fruity aroma.

Hithertofore, many attempts to intensify the ester flavor have been made. The attempts include a method in which alcohol is added to oils and fats containing volatile fatty acids, and a method in which a lipase derived from *Rhizopus chinensis* or from *Candida cylindracea* is employed to produce an ester compound [Japanese Published Examined Patent Application No. 50554/1981, Journal of the Japanese Society for Food Science and Technology, Vol. 30, No. 10, p.572, (1983)], a method in which the flavor is intensified by the addition of lipase derived from *Rizopus delemar*, *Aspergillus niger* or *Candida cylindracea* to fruit juice. (Japanese Published Examined Patent Application No. 39904/1977), etc.

Microbial esterases, for example, baker's and brewer's yeast [J. Inst. Brew., 82, 170, (1976)], sake yeast [Hakko Kogaku Kaishi, 64, 175, (1986)], sake koji [Hakko Kogaku Kaishi, 64, 247, (1986)], wine yeast [Tr. Tashk. Politekh. Inst., 107, 94, (1973)], fungi on grapes (*Botrytis cinerea*) [Izv. Akad. Nauk Mold. SSR. Ser. Biol. Khim. Nauk., 2, 78, (1975)], lactobacillus [J. Dairy Sci., 57, 1432, (1974), ibid., 57, 535, (1974)], etc. are known to contribute to ester formation.

Esterases and lipases from animal tissues are known to possess the ability to synthesize esters [Am. Chem. J. 24, 491, (1900)]. However, the study is silent about the application of the esterases and lipases to foods and beverages.

It is described that if lipase is allowed to work in a highly aqueous system, the reaction tends toward hydrolysis and that thus non-aqueous media are often used to induce ester synthesis [Science, 224, 1249, (1984), Japanese Published Examined Patent Application No. 39233/1988, Japanese Published Unexamined Patent Application No. 116629/1983].

Methods of producing cheese flavors by use of pregastric esterases derived from mammals and lipase derived from microorganisms are known (Japanese Published Unexamined Patent Application No. 113869/1984, Japanese Published Unexamined Patent Application No. 66856/1984, Japanese Published Unexamined Patent Application No. 14369/1972). Tests by the present inventors on the ability to synthesize esters using enzymes derived from microorganisms and enzyme preparations from the larynx or pancreas of animals reveals that satisfactory ester synthesis was not observed (refer to Table 1 hereinafter).

It has been found that esters produced by the ester-synthesizing enzymes derived from animal organs impart desirable flavors to foods and beverages. Particularly, the enzymes have been found to possess ester-synthesizing activity even in aqueous solutions having extremely low alcohol concentrations, which indicates that the enzymes are useful as ester flavor additives for foods and beverages.

DISCLOSURE OF THE INVENTION

According to the present invention, foods and beverages having a desirable aroma and a desirable taste can be produced by bringing an animal-derived, ester-synthesizing enzyme having a potency in the range of 0.1 unit/mg protein or higher under the conditions that ethyl butyrate is formed by reacting 0.5% (W/W) [hereinafter % means % (W/W)] ethanol with 2.6% butyric acid, or a substance containing the enzyme [hereinafter referred to as the ester-synthesizing enzyme substance] into contact with the foods and beverages during their production processes.

The one unit as used herein is defined as the potency of the enzyme activity which produces 1 micromole of ethyl butyrate in 1 minute, under the assay conditions described below.

The foods and beverages to which the present invention is applied, include any foods and beverages whose production involves a step suitable for an enzyme reaction. In particular, considerable effects may be expected when the present invention is applied to foods and beverages whose production requires a fermentation step. Specifically, bread (including sweet bread, etc.), fermented seasonings (miso, soy sauce, etc.), alcoholic liquors (sake, wine, beer, shochu, whiskey, brandy, gin, rum vodka, Huangjiu, Baijiu, etc.) alcoholic seasonings (alcoholic products stipulated by the Japan Liquor Tax Act; for example, sweet sake, sake-like seasonings, etc.), processed meat products (ham, bacon, sausage, corned beef, smoked chicken, roast pork, smoked tongue, hamburg steak, meatballs, jiaozi, shao-mai, etc.), daily products [fermented milk (yoghurt, etc.), cheese, fermented butter, fermented cream, etc.], and pickles (soy pickles, miso pickles, sake kasu pickles, malted rice pickles, vinegar pickles, rice bran pickles, mustard pickles, moromi pickles, suguki pickles, pickled cucumbers, Korean pickles, sauerkraut, etc.) are mentioned.

As the enzyme substance to be used in the present invention any purified enzyme, crude enzyme or enzyme-containing substance can be used, so long as it is derived from animals, has the ability to produce an ester in the presence of an alcohol and an organic acid, and has the ability to produce ethyl butyrate in the potency of 0.1 unit/mg of protein or higher in the enzyme reaction of 0.5% ethanol with 2.6% butyric acid as the substrates.

Particularly, when the ester-synthesizing activity at a 5% ethanol concentration is defined as 100, then ester-synthesizing enzyme substance having 30 or higher of the ester-synthesizing activity at a 0.5% ethanol concentration, preferably 60 or higher, is considered to be the most preferable enzyme substance.

The enzyme (lipase) which possesses ester-synthesizing activity generally tends towards hydrolysis in solutions having low alcohol concentrations, and is considered to be poor in production of ester. The enzyme substance having such ester-synthesizing activity in a 0.5% alcohol solution can so adequately produce esters as to impart a flavor to foods in particular, foods and beverages having a high water content.

As the alcohols, methanol, ethanol, propanol, isopropanol, butanol, isobutanol, amyl alcohol, isoamyl alcohol, phenetyl alcohol, hexanol, etc. may be used.

As organic acids, formic acid, acetic acid, butyric acid, isobutyric acid, folic acid, isofolic acid, caproic acid, enanthic acid, caprylic acid, pelargonic acid, capric acid, lauric acid, myristic acid, palmitic acid, oxalic acid, malonic acid, succinic acid, glutaric acid, adipic acid, fumaric acid, lactic acid, malic acid, citric acid, tartric acid, pyruvic acid, levulinic acid, gluconic acid, phenylacetic acid, etc. may be used.

The ester-synthesizing enzyme substance used may be taken from, for example, the liver, kidney, heart or other organ of an animal, such as pig, cow, horse and goat.

A detailed explanation for a method for the production of the preferred enzyme substance from the animal organs is given below.

According to the present invention, an ester-synthesizing enzyme substance may be added during any step of the production process for foods and beverages, so long as no inactivation of the enzyme is occurred. For fermented foods and beverages it is preferable to make the addition of the ester-synthesizing enzyme substance during the fermentation step.

Formation of esters during the enzyme reaction requires the presence of the above mentioned alcohol and organic acid, but if these components are produced during the process then no addition is required. Addition of alcohols and organic acids is not necessary in case of fermented food, particularly fermentations involving yeast where alcohols and organic acids are usually produced. In cases where the present invention is applied to foods and beverages in which alcohols or organic acids are not present or only in small amounts, an appropriate substrate may be added to the foods or beverages along with an ester-synthesizing enzyme substance for the ester production reaction, in order to impart a desirable flavor to the foods or beverages.

Since the relationship between aroma and flavor is subtle, for each type of foods and beverages, the selection of the type of alcohol and organic acid, and the timing of addition of these substrates, etc. should be determined experimentally. Such experiments may be easily conducted by any one skilled in the art.

The addition levels of the ester-synthesizing enzyme substance to foods and beverages depends on the type, food ingredient formula and the production conditions of the foods or beverages, and the desired intensity of the ester flavor to be produced during the production process. However, it may be normally added at 0.0001–10.0 and preferably 0.0002–5.0 units/kg of the foods or beverages. The unit is defined in terms of the ester-synthesizing activity which is determined by the method described below.

Next, the method of preparing the enzyme substance is explained below. Determination of the enzyme activity, that is, determination of the ester synthesis and hydrolysis activity, was done by the methods described below.

(1) Method for Determining the Ester-Synthesizing Activity

The ester-synthesizing activity is determined by measuring the amount of ethyl butyrate produced from ethanol and butyric acid as the substrates. The substrate solution is prepared by adding 0.5% or 5% ethanol and 2.6% butyric acid to a 0.1M phosphate buffer solution (pH 6). The pH was adjusted to 6 using sodium hydroxide. To 1.9 ml of the substrate solution is added 0.1 ml of the enzyme solution prepared by the method described below, and mixed each other. The mixture was allowed to stand at 30° C. for 10 minutes, and 1 ml of acetone is added to stop the reaction. Next, 2.0 ml of aqueous ethyl ether containing 50 μM ethyl caproate as the internal standard is added and mixed, and the mixture is subjected to the centrifugation (3000×g, 10 minutes). The upper layer obtained is then subjected to gas chromatography to determine the amount of ethyl butyrate produced. Also, to the same substrate solution containing 1 ml of acetone, the enzyme solution is added and the resulting mixture is used as the blank sample. The enzyme activity is expressed, defining the amount of enzyme which produces 1 μmol of ethyl butyrate in 1 minute under the conditions described above (0.5% ethanol concentration in the reaction system) as one unit.

(2) Method of Determining the Ester Hydrolysis Activity

The ester hydrolysis activity is determined in the following manner, with reference to the method described in Methods in Enzymology, 77, 333 (1981).

The substrate solution is prepared by dissolving 18.1 mg of p-nitrophenyl acetate in 1 ml of acetonitrile, and adding a Tris malate buffer (50 mM, pH 7.0) to make 100 ml solution. 0.2 ml of the enzyme solution is added to 1.8 ml of the substrate solution. The mixture is allowed to stand at 30° C. for 10 minutes, followed by the addition of 1 ml of acetone to stop the reaction and the absorbance is measured at 405 nm. With absorbance values of 0.2 to 1.0 thus obtained, a linear relationship was observed between the enzyme amount and the absorbance. The amount of enzyme required to hydrolyze 1 μmol of p-nitropheny acetate in 1 minute under the conditions described above, is defined as one unit.

(3) Method of Determining the Specific Activity

The protein assay is carried out using a protein assay kit (PROTEIN ASSAY, Bio-Rad Laboratories) with bovine serum albumin as the standard solution.

(4) Method for the Preparation of the Enzyme Ssubstance Used in the Present Invention 1) Method for the Preparation of the Enzyme-containing Solution from an Animal Organ After mincing the organ, a buffer solution (pH 6–7) containing sucrose is added thereto, and the mixture is disrupted and then subjected to centrifugal separation. The resulting supernatant is then adjusted to a pH of 4.5–5.5 with an acid (acetic acid, etc.), and subjected to centrifugal separation to obtain a precipitate. The precipitate is defatted with a solvent (acetone, etc.) and suspended in a buffer solution (pH 6–7). The suspension is then centrifuged and ammonium sulfate is added to the obtained supernatant to 70% saturation, and the mixture is subjected to centrifugation. The precipitate obtained is then suspended in 3.2M ammonium sulfate to obtain the enzyme-containing solution.

2) Method for the Preparation of the Enzyme-containing Solution from a Microorganism for Use in the Comparison Test Yeasts or fungi are cultured, for example, in a YM culture medium composed of glucose, malt extract, yeast extract and peptone, whereas lactobacilli are cultured at 35°–40° C. using, for example, a medium for Lactobacilli inoculum Broth (Nissui Pharmaceutical Co.). The culture is separated by centrifugation into cells (precipitate) and a supernatant. The cells are washed with distilled water, suspended in a buffer solution (pH 5.5–6.5) and disrupted, and then ammonium sulfate is added thereto to 70% saturation. The precipitate obtained by centrifugation is dissolved in a buffer solution (pH 5.5–6.5) and used as the enzyme substance.

Also, the culture solution is subjected to membrane filtration. Ammonium-sulfate is added thereto to 70% saturation, and the precipitate obtained by centrifugation is suspended in 3.2M ammonium sulfate to obtain the enzyme-containing solution.

3) Method for the Preparation of an Enzyme-containing Solution from a Commercially Available Lipase Preparation for Use in the Comparison Test A commercially available lipase preparation is dissolved in a buffer solution (pH 5.5–6.5). The solution is subjected to centrifugation and membrane filtration to obtain the enzyme-containing solution.

Also, an enzyme powder product is obtained by drying the above mentioned enzyme-containing solution by a conventional method, for example, lyophilization.

The ester-synthesizing activity and ester hydrolysis activity of each of the enzyme-containing products are shown in Table 1.

TABLE 1

| Enzyme substance*[1] | Ester-synthesizing activity (units/mg of protein) Ethanol concentration | | Ester hydrolysis activity (units/mg of protein) |
|---|---|---|---|
| | 0.5% | 5% | |
| Pig liver | 0.37 (80)*[2] | 0.46 | 39.40 |
| Pig kidney | 0.35 (74) | 0.47 | 12.22 |
| Cow liver | 0.37 (95) | 0.39 | 40.31 |
| Cow kidney | 0.35 (85) | 0.41 | 10.71 |
| Cow heart | 0.29 (96) | 0.30 | 3.96 |
| Shochu yeast (Japan Brewing Society) | | | |
| Cells | ND*[3] | ND | 0.38 |
| Supernatant A | ND | ND | 7.22 |
| Miso yeast (Japan Brewing Society) | | | |
| Cells | ND | ND | 0.09 |
| Supernatant A | ND | ND | 5.54 |
| Soy sauce yeast (Japan Brewing Society) | | | |
| Cells | ND | ND | 0.14 |
| Supernatant A | ND | ND | 0.86 |
| Bread yeast (DAIYA YEAST, Kyowa Hakko Kogyo Co., Ltd.) | | | |
| Cells | ND | ND | 0.06 |
| Supernatant A | ND | ND | 0.23 |
| Sake yeast (Japan Brewing Society No. 7) | | | |
| Cells | ND | ND | 0.05 |
| Supernatant A | ND | ND | 0.17 |
| Sake yeast (Japan Brewing Society No. 9) | | | |
| Cells | ND | ND | 0.06 |
| Supernatant A | ND | ND | 0.23 |
| Wine yeast (Japan Brewing Society OC No. 2) | | | |
| Cells | ND | ND | 2.29 |
| Supernatant A | ND | ND | 6.38 |
| Aspergillus oryzae IFO 30104 | | | |
| Cells | ND | ND | 0.72 |
| Supernatant B | ND | ND | 2.57 |
| Aspergillus awamori IFO 4033 | | | |
| Cells | ND | ND | 3.27 |
| Supernatant B | ND | ND | 7.93 |
| Aspergillus solae ATCC 16320 | | | |

TABLE 1-continued

| Enzyme substance*[1] | Ester-synthesizing activity (units/mg of protein) Ethanol concentration | | Ester hydrolysis activity (units/mg of protein) |
|---|---|---|---|
| | 0.5% | 5% | |
| Cells | ND | ND | 2.10 |
| Supernatant B | ND | ND | 7.32 |
| Botrytis cinerea IFO 5881 | | | |
| Cells | ND | ND | 3.87 |
| Supernatant B | ND | ND | 4.54 |
| Lactococcus lactis subsp. lactis ATCC 15346 | | | |
| Cells | ND | ND | 0.23 |
| Supernatant C | ND | ND | 6.14 |
| Lactococcus lactis subsp. lactis IFO 3434 | | | |
| Cells | ND | ND | 0.22 |
| Supernatant C | ND | ND | 5.67 |
| Lactococcus lactis subsp. cremoris AHU 1175 | | | |
| Cells | ND | ND | 0.38 |
| Supernatant C | ND | ND | 3.96 |
| Lactobacillus plantarum ATCC 21028 | | | |
| Cells | ND | ND | 0.30 |
| Supernatant C | ND | ND | 6.19 |
| Lactobacillus casei IFO 3425 | | | |
| Cells | ND | ND | 0.48 |
| Supernatant C | ND | ND | 1.87 |
| Lactobacillus sp. IFO 3914 | | | |
| Cells | ND | ND | 0.41 |
| Supernatant C | ND | ND | 7.98 |
| Lipase M (from Mucor javanicus, Amano Pharmaceutical Co.) | ND | ND | 2.86 |
| Lipase F (from Rhizopus sp., Amano Pharmaceutical Co.) | ND | ND | 4.17 |
| Lipase A (from Aspergillus niger, Amano Pharmaceutical Co.) | ND | ND | 1.48 |
| Lipase P (from Pseudomonas sp., Amano Pharmaceutical Co.) | 0.012 (8) | 0.14 | 170.70 |
| Lipase MY (from Candida cylindracea, Meito Sangyo Co.) | 0.018 (22) | 0.08 | 13.90 |
| Lipase Au (from Arthrobacter ureafaciens, Shin Nihhon Chemical Co.) | ND | ND | 30.70 |
| Lipase LP (from Chromobacterium viscosum, Toyo Jozo Co.) | 0.011 (5) | 0.20 | 68.60 |
| Palatase M (from Mucor miehei, Novo Nordisk Co.) | ND | ND | 1.27 |
| Neurase F (from Rhizopus niveus, Amano Pharmaceutical Co.) | ND | ND | 0.23 |
| Talipase (from Rhizopus delemar, Tanabe Seiyaku Co.) | ND | ND | 1.04 |
| Pancreatic lipase 250 | ND | ND | 0.03 |

TABLE 1-continued

| Enzyme substance*[1] | Ester-synthesizing activity (units/mg of protein) Ethanol concentration | | Ester hydrolysis activity (units/mg of protein) |
|---|---|---|---|
| | 0.5% | 5% | |
| (from pig pancreas, Kyowa Solzyme Co.) | | | |
| Lipase 400 (from lamb and young goat larynx, Miles Kyowa Co.) | ND | ND | 0.07 |
| Lipase 600 (from calf larynx, Miles Kyowa Co.) | ND | ND | 0.24 |

Note:
*[1]Obtained in the reference examples described below
*[2]Numbers in brackets: ester-synthesizing activity in a reaction mixture with a 0.5% ethanol concentration, where ester-synthesizing activity in a reaction mixture with a 5% ethanol concentration is defined as 100.
*[3]ND: Not detected It can be seen from Table 1 that the ester-synthesizing activity of the enzyme substances derived from pig liver, pig kidney, cow liver, cow kidney and cow heart is the higher.

The present invention is described below, according to the kind of foods and beverages.

1) Method of Making Bread

Breadmaking by the sponge dough method proceeds as follows. As ester-synthesizing enzyme substance and water are added to the main ingredients comprising wheat flour and baker's yeast, and the mixture was kneaded, and then fermented (first fermentation) at 25°–35° C. for 2–5 hours. The fermented product is mixed with the dough ingredients mostly comprising wheat flour, sugar and shortening and to the mixture is added water, and the resulting ingredients are mixed and kneaded into a dough. The dough is normally allowed to stand at 25°–35° C. for 10–40 minutes (floor time). Next, the dough is divided into pieces of suitable size and is allowed to stand at 15°–35° C. for 10–30 minutes (bench time). The dough pieces are then formed and placed in a mold, where final fermentation is done at 35°–45° C. until the dough rises to a determined height. Thereafter, the dough pieces are baked at 180°–240° C. for 10–30 minutes.

Breadmaking by the straight method proceeds as follows.

The ester-synthesizing enzyme substance and water are added to the ingredients mostly comprising wheat flour, sugar, shortening and yeast food, etc., and the mixture is kneaded into a dough. The dough is fermented at 25°–35° C. for 60–180 minutes. Next, the dough is divided into pieces of suitable size and is allowed to stand for 10–30 minutes (bench time) at 15°–35° C. Subsequently, the dough pieces are formed and placed in a mold, where final fermentation is carried out at 35°–45° C. until the dough rises to a determined height. Thereafter, the dough pieces are baked at 180°–240° C. for 10–30 minutes.

2) Method for the Production of Fermented Seasoning

Miso is produced, for example, in the following manner. Soybean is washed with water and then is soaked in water having a volume of 2.5–3.5 times its weight for 10–24 hours. The water is removed and soybean is steamed for 5–80 minutes under 0.5–2.0 kg/cm$^2$. Then soybean is cooled to 30°–40° C. and finally a mincer is used to push it through a 1–5 mm mesh. Separately, polished rice or wheat is washed with water and is soaked in water for 10–24 hours. The water is removed and rice or wheat is steamed, and allowed to cool. A seed koji is added thereto when the temperature reaches about 35° C. Then, a koji is produced by culturing. Then koji, salt and water are added to the previously steamed soybean, and if necessary, miso yeast is added thereto and mixed. Fermentation is carried out with stirring at 15°–37° C. for 1–12 months while airating the mixture about once every 20–40 hours, to obtain the fermented product. The ester-synthesizing enzyme substance is then added to the fermented product, and fermentation is carried out at 15°–37° C. for 1–10 days to obtain miso. If necessary, it may also be heated, for example, at 65°–85° C. for 10–30 minutes for completion.

Soy sauce is produced, for example, in the following manner. Wheat is roasted to slight burnt patches on the surface, and is broken into 4–5 pieces with a crusher. An equal amount of de-fatted soybean is swelled with hot water to about 120–130%. De-fatted soybean is steamed, and mixed with the crushed wheat. The mixture is then cooled to 40° C. or lower, followed by addition of seed koji. Koji is produced using an aerated koji maker. Salt is then added thereto and, if necessary, soy sauce yeast is also added thereto. Fermentation is carried out at 15°–30° C. for 4–15 months with stirring about once every week, to obtain a moromi. The moromi is squeezed to obtain fresh soy sauce. To the fresh soy sauce is then added the ester-synthesizing enzyme substance and the mixture is further fermented at 15°–30° C. for 1–10 days to obtain soy sauce. Also, if necessary, the soy sauce may be heated at, for example, 80°–85° C. for 10–30 minutes and filtered for completion.

3) Method for the Production of Alcohols

A carbon source is saccharified with enzymes or koji, and yeast is added to the mixture which is then fermented. During the fermentation, an ester-synthesizing enzyme substance is added thereto. For the production of sake or shochu, normally a portion of carbohydrate substances is charged at the beginning of the fermentation, and the remaining carbohydrate substances are added stepwise in the course of the fermentation steps.

A carbohydrate or starch may be selected for the carbon source, depending on the desired type of alcohols. For example, potatoes, buck wheat, rice (nonglutinous rice, glutinous rice, etc.), barley, foxtail millet, Deccan grass, corn maize, gaoliang, common millet, etc. or starches thereof, koji thereof, fruits such as grapes, etc., molasses, glucose, etc. may be used.

As carbohydrase, those produced by Aspergillaceae such as *Aspergillus oryzae*, *Aspergillus awamori*, *Aspergillus kawachii*, etc., and enzyme preparations such as enzymes in koji, amylase, protease, etc. may be used. As the yeast, a microorganism belonging to the genus Saccharomyces may be used.

If a carbohydrate such as fruit, for example, grapes, or molasses, glucose, etc. may be used, single fermentation is carried out by direct addition of the yeast. If cereals, such as rice, barley, buck wheat, corn maize, gaoliang, common millet, Deccan grass, etc. and potatoes may be used, parallel complex fermentation is carried out by first decomposing the cereals which are a starchy substance, into saccharide using a carbohydrase, and then adding yeast for fermentation.

The temperature and period for the fermentation should be, for example, 10°–20° C., 12–25 days for sake; 15°–30° C., 5–20 days for wine; 0°–15° C., 5 days–2 months for beer; 15°–35° C., 2–30 days for distilled spirits such as whiskey, vodka, gin, rum, etc.; and in a filled barrel in the ground, 4–5 days at the shortest and 1–9 months at the longest for Chinese sake (Huangjiu, Baijiu, etc.).

Next, there are a number of methods for changing moromi produced by yeast fermentation into an alcohol, depending on the type desired. For example, in the case of wine, beer, sake and Huangjiu, after fermentation of the moromi is completed, filtration is done to separate the fermentation residue and the yeast cells from the pure alcohol. In the case of whiskey, brandy, rum, gin, vodka and Baijiu, a distiller, etc. are used to distill the moromi into a pure alcohol. The alcohols obtained by these methods may be used as such, or alternatively, may be heated and mixed to increase the preservability and to stabilize the quality thereof. Heating is done for sterilization and for halt of the maturation, with heat treatment at a product temperature of 60°–80° C. Mixing involves the addition of separate alcohols and the combining of other products, in order to maintain a specific product in the case of brewed alcohols such as sake, wine, etc., and to adjust the alcohol concentration in the case of distilled spirits.

4) Method for the Production of Alcohol-containing Seasonings

The alcohol-containing seasonings are produced, for example, in the following manner.

The same materials as those for producing alcohols are used, and the same production steps as described for production of alcohols are applied. The characteristic aspect in the case of alcohol-containing seasonings, is that the production steps includes addition of salt, vinegar, etc. to the moromi before completion of fermentation (undrinkable by the Liquor Tax Act), followed by filtration or addition of a seasoning substance such as sugar, an organic acid, amino acid, animal or plant extract, fruit juice, vitamin, spice, etc. to obtain a composition suitable for seasoning. Also, in the case of sweet sake, there is no step of fermentation with yeast in the production process, but rather the production process involves saccarification of glutinous rice, followed by addition of shochu prepared in advance or other alcohol.

5) Method for the Production of Processed Meat Products

An explanation will be given for a method for the production of typical examples, ham, bacon and sausage.

(1) Method for the Production of Ham and Bacon

The meat to be used as the main material is cut and shaped, and extra ingredients and an ester-synthesizing enzyme substance are added for curing. The cured substance is loaded into, for example, a casing, and then dried, smoked and cooked for completion.

As meats, those from cattle, pigs, goats, horses, rabbits, reindeer, camels, domestic fowl, whales, fish, etc. may be used.

As extra ingredients, salt, sweetening agent (sugar, glucose, lactose, etc.), protein (milk proteins, casein, etc.), binding agent (phosphate, etc.), preservatives (sorbic acid, etc.), antioxidants (ascorbic acid, sodium ascorbate, erythorbic acid, sodium erythorbate, etc.), developers (nitrate, sodium nitrite, etc.), spices (pepper, nutmeg, cardamomum, paprika, ginger, coriander, etc.) may be used.

The microorganisms brought from the raw substances, etc. include those belonging to the genus Streptococcus, Leuconostoc, Lactobacillus, Micrococcus, Debaryomyces, Mucor, Rhizopus, Penicillium, or Aspergillus.

The curing is normally done at 1°–40° C. for 15 hours –1 month, by immersion, injection, rubbing, etc. of a curing agent composed of extra raw ingredients into a raw meat substance. The filling is done in a casing of animal intestine, etc. using, for example, a stuffer, etc.

The drying is done at 15°–80° C. for 30 minutes–5 days. The smoking is done at 15°–140° C. for 30 minutes–5 days. The cooking is done until the temperature of the center of the meat reaches 60°–70° C.

(2) Method for the Production of Sausage

The meat to be used as the main raw ingredient is minced. Extra raw ingredients and an ester-synthesizing enzyme substance are added thereto, and the meat is cured and completed in the same manner as described in the method for the production of ham and bacon. The type of meat and extra ingredients which may be used include those used for ham and bacon.

Also, in the case of the production of fermented sausages, a microorganism is added as a starter during curing in the method for the production of sausages mentioned above.

As the microorganism, those belonging to the genus Lactobacillus, Streptococcus, Pediococcus, Debaryomyces, Micrococcus, Staphylococcus or Penicillium may be used.

6) Method for the Production of Dairy Products

An explanation will be given for the method of production of yoghurt and cheese.

(1) Method for the Production of Yoghurt

Milk, or a mixture of milk and a stabilizer is heated, and an ester-synthesizing enzyme substance and a microorganism as a starter are added thereto. Fermentation is allowed to proceed to obtain yoghurt.

As the milk, those from mammals such as cows, goats, camels, yaks, horses, donkeys, reindeer, etc. may be used. It may be used in any form, for example, whole milk, concentrate milk, dried milk, skim milk, etc.

As the stabilizer, xanthan gum, agar, gelatin, pectin, etc. may be used.

If necessary, a sweetening agent (glucose, saccharose, etc.), flavoring agent, coloring agent, etc. may be further added.

Heat is applied at 60°–100° C. for 10 minutes–1 hour.

As the microorganism used as the starters, those belonging to the genus Streptococcus, Lactobacillus or Bifidobacterium may be used.

The fermentation is carried out at 20°–40° C. for 2–10 hours.

(2) Method for the Production of Cheese

Calcium chloride is, if necessary, added to milk for reinforcement with calcium, and the mixture is heated. Next, an ester-synthesizing enzyme substance and a microorganism (starter) are added thereto and fermented. Rennet is further added thereto and the milk is coagulated. It is then cut thin and heated, if necessary. The whey is removed, i.e. the water is removed and then it is put into moulds and compressed to obtain fresh cheese. Salt is added thereto, and if necessary, mold is allowed to grow on the surface of the fresh cheese, or the surface is coated with edible cheese wax, and aged to cheese. Also, the natural cheese produced in this manner is heated to melting, emulsified and molded to produce processed cheese.

The milk which may be used includes those used for the production of yoghurt.

As microorganisms, those belonging to the genus Streptococcus, Leuconostoc, Lactobacillus, Bifidobacterium, Penicillium, Candida, Debaryomyces or Geotrichum may be used.

The fermentation is carried out at 20°–40° C for 2–10 hours.

7) Method for the Production of Pickles

Pickles are obtained by pickling large quantities of a starting material for pickles together with an ester-synthesizing enzyme substance in a pickle base comprising salt, soy sauce, miso, kasu (pressed cake from sake or sweet sake production), koji, vinegar, bran (rice bran, wheat bran, etc.), mustard, moromi (soy sauce moromi, miso moromi, etc.), or in a seasoning liquid which is prepared by adding to the pickle base sugar (glucose, sucrose, etc.), organic acids, (citric acid, succinic acid, etc.), amino acids (sodium glutamate, etc.), vitamins (vitamin C, vitamin $B_2$, etc.), sweet sake, shochu, spices, flavoring agents, coloring agents, sweetening agents, preservatives, thickeners, etc. The microorganism plays a role in the pickling process.

Further, the starting material pickled in the pickle base or seasoning liquid is sometimes steeped in a new pickle base or seasoning liquid, either as it is or after desalting with water, etc., for secondary processing (main pickling). In this case, the pre-pickling with salt in order to remove excess water from the starting material is called "pre-pickling", and is subjected to secondary processing in the same manner. The starting material available for use in pickling includes, for example, vegetables such as Brood leaved mustard, Chinese cabbage, cabbage, leaf mustard, scallions, Red pepper, garlic, bamboo shoots, butterbur, bracken, osmunda, celery, onions, radishes, turnip, ginger, Japanese horseradishes, burdocks, eggplants, cucumbers, melons, bean sprouts, Japanese ginger, chrysanthemum, cauliflour, etc.; fruits such as apricots, plums, etc.; seaweeds such as kelp, Undaria, etc.; and mushrooms such as Shiitake, *Lyophyllum aggregatum*, champignon, etc., and they may be used fresh or heated and dried.

As microorganisms, those belonging to the genus Leuconostoc, Streptococcus, Lactobacillus, Pediococcus, Saccharomyces, Zygosaccharomyces, Torulopisis, Hansenula, Pichia, Mycoderma, Debaryomyces, Candida or Kloeckera may be used.

The pickling is carried out, for example, at 0°–40° C., from 1 day to 12 months, depending on the type of pickle desired, the processing of the substance, the salt concentration, pH, etc.

BEST MODE FOR CARRYING OUT THE INVENTION

Figure 1:
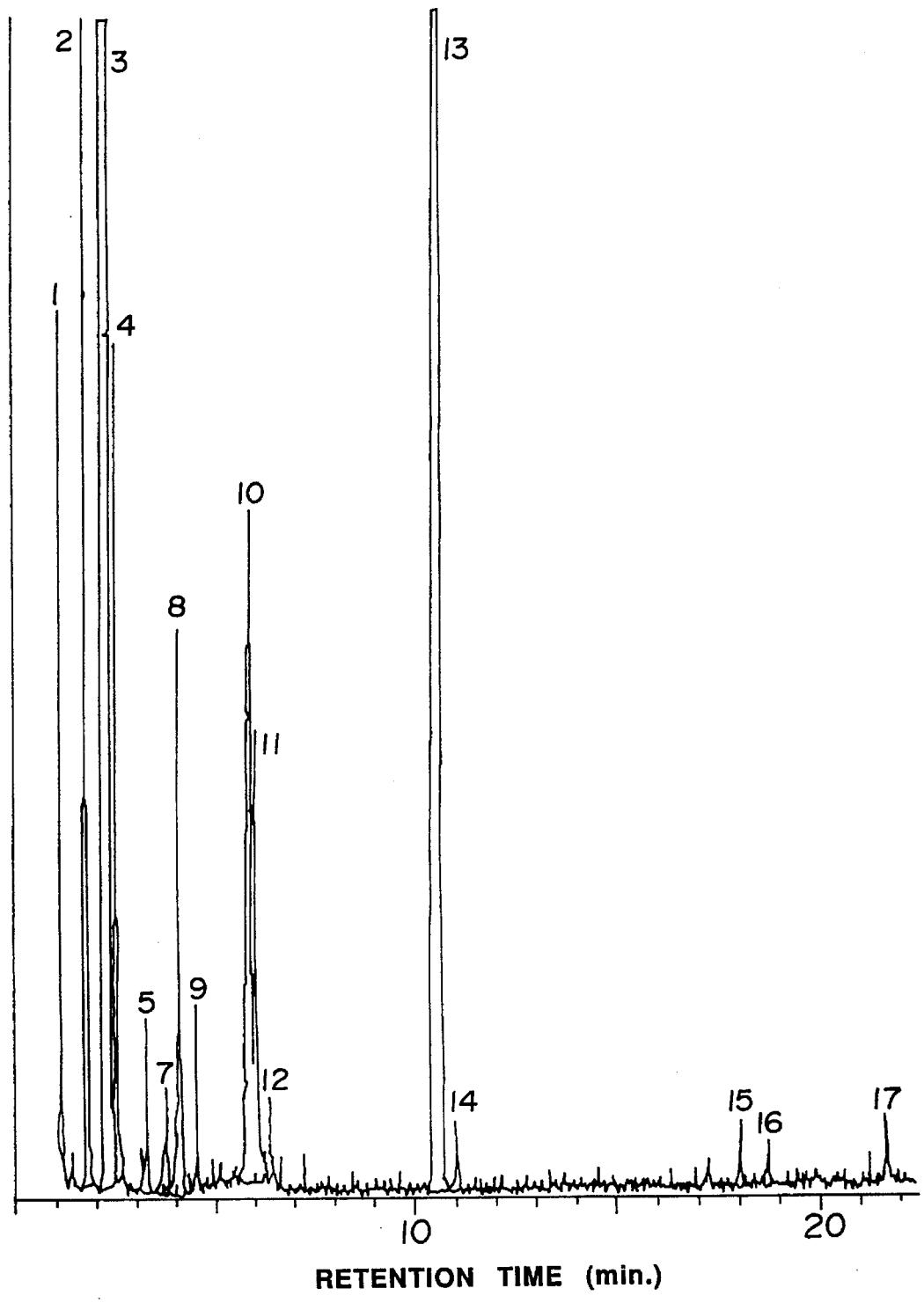
FIG. 1 shows a gas chromatograph analysis of the aromatic components in the sponge dough in the case where ester-synthesizing enzyme substance was added.

Examples, comparing examples and reference examples are given below.

Example 1

Method for the Production of Bread

Bread was produced according to the formula and procedure described below. The ingredient formulas listed in the Examples are expressed as parts by weight, defining the entire amount of wheat flour to be used as 100, in the production of the bread.

| Formula of Sponge ingredients (parts by weight) | |
| --- | --- |
| Wheat flour | 70 |
| Yeast | 2 |
| Yeast food | 0.1 |
| Water | 42 |
| Enzyme substance | Shown in Table 2 |
| (Amount added: units/wheat flour 100 parts by weight) | |
| Formula of dough ingredients (parts by weight | |
| Wheat flour | 30 |
| Sugar | 5 |
| Salt | 2 |
| Shortening | 5 |
| Defatted milk powder | 2 |
| Water | 26 |

Production Process

The above mentioned sponge ingredients and enzyme substance were kneaded using a vertical mixer (Type SS-151: manufactured by Kanto Mixer, Inc.; the same is applied hereinafter), at low speed (30 rpm; the same is applied hereinafter) for 3 minutes and at medium speed (60 rpm; the same is applied hereinafter) for 1 minute. Sponge fermentation was carried out at 28° C. for 4 hours. The mixing temperature was 24° C.

The thus obtained dough and the dough ingredients except for the shortening were mixed together using a vertical mixer, at low speed for 3 minutes and at medium speed for 2 minutes. Then the shortening was added thereto, and mixed at low speed for 2 minutes, at medium speed for 3 minutes, and at high speed (90 rpm; the same is applied hereinafter) for 2 minutes. Next, 20 minutes of floor time were taken at room temperature, and the dough was divided, rounded, allowed to stand at room temperature for 20 minutes (bench time), and moulded using a moulder. The dough was then fermented in a proofing box at 38° C., having a relative humidity of 85% for 50 minutes, and finally baked at 220° C. for 28 minutes.

The loaves were then allowed to stand at room temperature for 2 hours, and they were packed, and further allowed to stand at room temperature for 20 hours. An organoleptic test was conducted with trained panels to evaluate the quality of the bread.

The results are shown in Table 2.

TABLE 2

| Item | Enzyme substance in Reference Example 1 (from pig liver) | | | | Not added | Lipase MY | |
|---|---|---|---|---|---|---|---|
| | (0.02) | (0.05) | (0.10) | (0.50) | | (0.02) | (0.50) |
| Ester Flavor | 1.6 | 1.8 | 1.8 | 2.3 | 0.7 | 0.6 | 0.7 |
| Alcohol smell | 1.6 | 1.6 | 1.5 | 1.0 | 1.6 | 1.5 | 1.5 |
| Stuffy odor | 0.4 | 0 | 0.1 | 0.1 | 0.6 | 0.7 | 0.6 |
| Number of panels expressing preference | 7 | 3 | 1 | 0 | 0 | 0 | 0 |

Note:
Average value of panels' evaluation of the strength of the ester flavor, alcohol smell and stuffy odor, based on the following criteria:
0: unnoticeable
1: Slightly noticeable
2: Clearly noticeable
3: Very noticeable
(The same method of evaluation was used in the subsequent tables.)

As seen from the table, when the enzyme substance in Reference Example 1 is added to the bread dough, a desirable ester flavor increases in the bread, whereas the stuffy odor decreases. Bread with 0.02 units of enzyme substance added was most preferable.

On the other hand, bread using commercially available Lipase MY had no increase in the desirable ester flavor, nor was there any decrease in the stuffy odor. No panels like this bread.

Example 2

Method for the Production of Bread

A fermentation product is prepared using wheat flour, water, yeast and an enzyme substance (the enzyme substance from pig liver in Reference Example 1 or Lipase LP), and the product is added as the fermented seasoning in the bread production process according to this example. The ingredient formula listed in this Example is expressed as parts by weight, defining the total amount of wheat flour to be used in the production of the bread fermented seasoning or the bread as 100.

| Formula of fermented seasoning for the bread (parts by weight) | |
|---|---|
| Wheat flour | 100 |
| Water | 180 |
| Yeast | 2 |
| Sugar | 10 |
| Enzyme substance | Shown in Table 3 |
| (Amount added: units/wheat flour 100 parts by weight) | |

The above mentioned fermented seasoning for the bread was allowed to stand at 30° C. for 24 hours, and the product was used as an additive for the production of bread indicated below.

| Formula of dough ingredients (parts by weight) | |
|---|---|
| Wheat flour | 100 |
| Sugar | 5 |
| Salt | 2 |
| Shortening | 5 |
| Defatted milk powder | 2 |
| Yeast | 3 |
| Water | 69 |
| Fermented seasoning | 10 |

The above mentioned dough ingredients were kneaded using a vertical mixer, at low speed for 3 minutes, at medium speed for 8 minutes and at high speed for 6 minutes. The resulting dough was then fermented at 28° C. for 40 minutes. The dough was divided and rounded, allowed to stand at room temperature for 20 minutes (bench time), and then moulded using a moulder. Then the subsequent procedure was repeated in the same manner as in Example 1 to produce bread. The organoleptic test for the bread was also conducted in the same manner as in Example 1. The results are shown in Table 3.

TABLE 3

| Item | Enzyme substance in Reference Example 1 | | | Not added | Lipase LP | |
|---|---|---|---|---|---|---|
| | (0.0002) | (0.001) | (0.01) | | (0.0002) | (0.01) |
| Ester flavor | 0.8 | 1.5 | 2.3 | 0.2 | 0 | 0.1 |
| Alcohol smell | 1.3 | 1.1 | 0.9 | 1.4 | 1.5 | 1.4 |
| Stuffy odor | 0.4 | 0.1 | 0.1 | 0.3 | 0.3 | 0.4 |
| Number of panels expressing preference | 9 | 2 | 0 | 0 | 0 | 0 |

As seen from the table, when the enzyme substance in Reference Example 1 is added to the bread dough, a desirable ester flavor increases in the bread. Bread with 0.0002 units of enzyme substance added was most preferable. On the other hand, bread produced using commercially available Lipase LP had no increase in the desirable ester flavor. No panels likes this bread.

Example 3

Method for the Production of Bread

Bread was produced with the formula and procedure described below. The ingredient formula listed in this Example is expressed as parts by weight, defining the total amount of wheat flour to be used in the production of the bread as 100.

| Formula of liquid sponge ingredients (parts by weight) | |
| --- | --- |
| Wheat flour | 30 |
| Sugar | 2 |
| Salt | 1 |
| Yeast | 2 |
| Water | 50 |
| Enzyme substance | Shown in Table 4 |
| (Amount added: units/wheat flour 100 parts by weight) | |
| Formula of dough ingredients (parts by weight) | |
| Wheat flour | 70 |
| Sugar | 5 |
| Salt | 1 |
| Shortening | 5 |
| Defatted milk powder | 2 |
| Yeast | 0.5 |
| Water | 20 |

Production Process

The above mentioned liquid sponge ingredients were mixed, and the mixture was fermented at 30° C. for 2.5 hours. The total amount of the fermentation product and the dough ingredients except for the shortening were kneaded together using a vertical mixer, at low speed for 3 minutes and at medium speed for 2 minutes. Then shortening was added thereto, and the mixture was kneaded at low speed for 2 minutes, at medium speed for 3 minutes, and at high speed for 5 minutes. Then, the subsequent procedure was repeated in the same manner as in Example 1 to produce bread for which an organoleptic test was conducted. The results are shown in Table 4.

TABLE 4

| Item | Enzyme substance in Reference Example 2 (from pig kidney) | | | Not added | Lipase P | |
| --- | --- | --- | --- | --- | --- | --- |
| | (0.01) | (0.05) | (0.1) | | (0.01) | (0.1) |
| Ester flavor | 0.5 | 1.2 | 1.9 | 0.2 | 0.1 | 0.1 |
| Alcohol smell | 1.4 | 1.3 | 1.3 | 1.4 | 1.3 | 1.4 |
| Stuffy odor | 0.6 | 0.2 | 0.3 | 0.7 | 0.8 | 0.7 |
| Number of panels expressing preference | 3 | 6 | 2 | 0 | 1 | 1 |

As seen from the table, when the enzyme substance in Reference Example 2 was added to the bread dough, the desirable ester flavor increased in the bread, and the stuffy odor decreased.

On the other hand, bread produced using commercially available Lipase P had no increase in the desirable ester flavor, nor was there any decrease in the stuffy odor. The bread manufactured by the addition of the enzyme substance in Reference Example 2 was preferred over the bread produced by Lipase P.

Test Example

Comparison

An analysis was made of the aromatic components in the bread manufactured by the sponge dough method.

| Formula of sponge ingredients | |
| --- | --- |
| Wheat flour | 131 g |
| Yeast | 3.8 g |
| Water | 78.8 ml |

Enzyme substance in Reference Example 1 (Amount added: 0.02 units/100 g wheat flour)

The above mentioned sponge ingredients were kneaded using a vertical mixer, at low speed for 3 minutes and at medium speed for 1 minute. The resulting product was then put into a 2 liter vessel and kept at 30° C. At the time when the fermentation began, 500 ml of nitrogen gas was introduced at one end of the vessel every minute for 17 hours, and a glass tube packed with 0.05g of an adsorbent (TENAX GC: Gasukuro Kogyo, Inc.) was attached to the opening of the vessel to adsorb the flavor components at the completion adsorption. The glass tube packed TENAX GC was put into a vial bottle (10 ml volume) for head space analysis. Heat was applied at 150° C. for 10 minutes for analysis of the compounds in the head space by gas chromatography/mass spectrometer (GC-MS). The result of gas chromatography is shown in FIG. 1.

Figure 2:
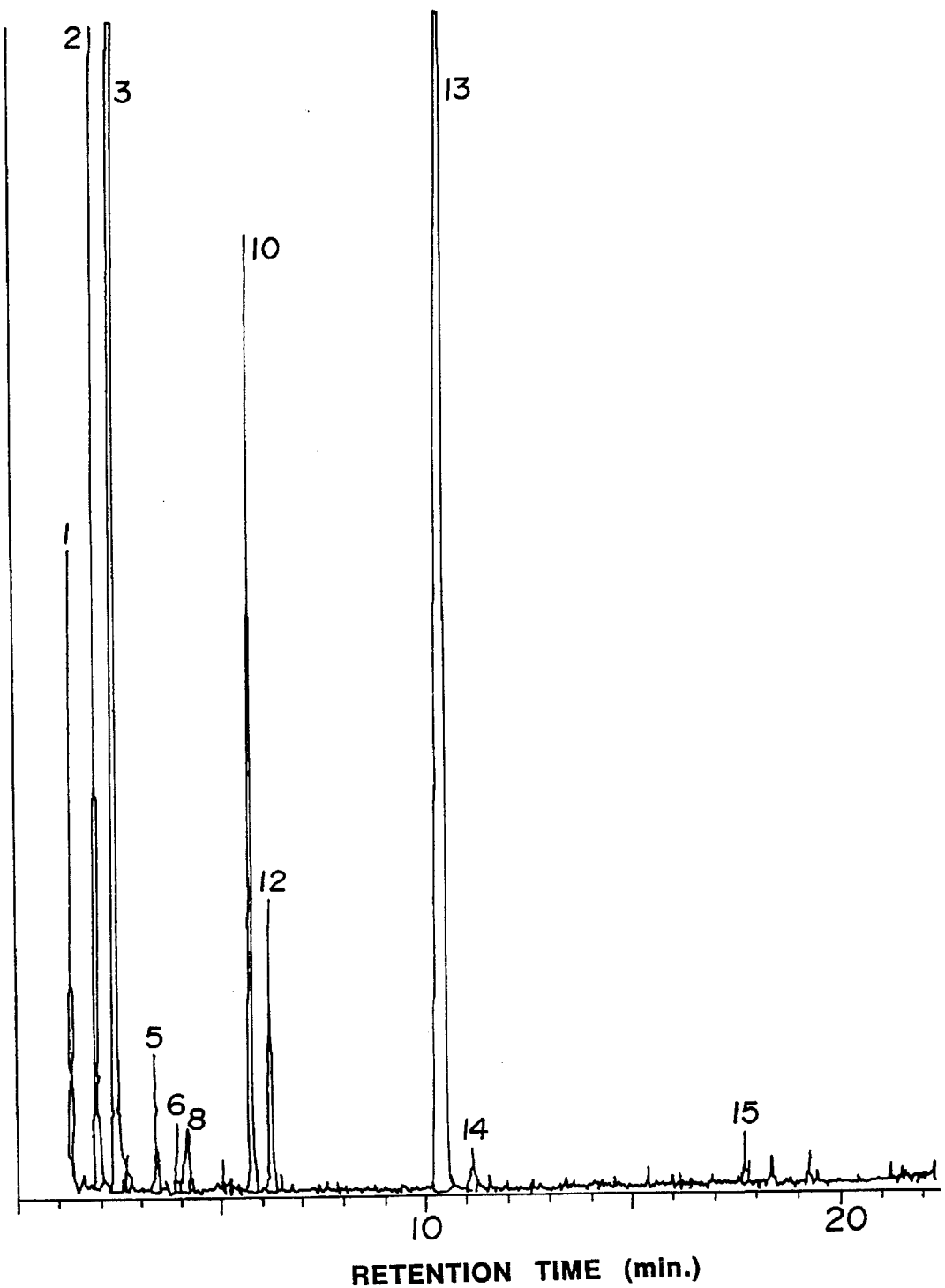
FIG. 2 shows a gas chromatograph analysis of the aromatic components in the sponge dough in the case where ester-synthesizing enzyme substance was not added.
Explanation of Symbols
  1. Carbon disulfide
  2. Ethyl acetate
  3. Ethanol
  4. Ethyl butyrate
  5. Butyl acetate
  6. Benzene
  7. Propanol
  8. 2-methylethyl acetate
  9. Ethyl valerate
  10. 1-propanol-2-methyl
  11. Pentyl acetate
  12. 3-penten-2-on-4-methyl
  13. 2-buten-2-methyl
  14. Ethyl caproate
  15. Hexanol
  16. 1-propanol-3-ethoxy
  17. Acetic acid

Also as the control, gas chromatography was conducted for the case in which enzyme was not added and the results are shown in FIG. 2.

| Analysis conditions: | |
| --- | --- |
| Analyzer: | HP5971A, 19395A (Hewlett Packard Co.) |
| Column: | DB-WAX (Polyethylene Glycol 20M), length 30m, inner diameter 0.25 mm, film thickness 0.25 µm (J & W Co.) |
| Carrier gas: | He |
| Flow rate: | 1 ml/min |
| Sample injection volume: | 1 ml (Split ratio = 1:10) |
| Oven temperature: | 38° C., 4 minutes increased by 2° C./min to 60° C. increased by 5° C./min to 150° C. |
| Injection temperature: | 150° C. |
| Interface temperature: | 250° C. |
| Detector: Ionization method: | EI ionization voltage: 70 eV |

As seen from FIGS. 1 and 2, larger amounts of ethyl butyrate, butyl acetate, ethyl valerate, pentyl acetate, ethyl caproate, etc. were detected in the sponge dough to which the enzyme substance in Reference Example 1 was added, than in the sponge dough with no enzyme substance added, and thus it was understood that the enzyme substance contributed to the synthesis of the various esters in the bread dough.

Example 4

Method for the Production of Miso

Soy beans were washed with water and then soaked overnight in 3 times as much as the amount of water. The soy beans were steamed under pressure of 0.5 kg/cm² for 60 minutes. Then, the soy beans were cooled to 35° C. and pushed through a 1.9 mm mesh using a mincer. Separately, polished rice was soaked in water for 17 hours, the water was removed. The rice was steamed under atmospheric pressure for 50 minutes. When the product temperature reached about 35° C., miso seed koji (*Aspergillus oryzae*, Akita Konno Store Co.) was added thereto, and the mixture was fermented in a koji room at 35° C. for 48 hours, turning it upside down once at the 42nd hour to obtain rice koji. Then 6 kg of the previously steamed soy beans, 2 kg of the rice koji, 1.36 kg of salt and 600 ml of water were mixed and fermented at 35° C. for 30 days to obtain a fermention product. The enzyme substance listed in Table 5 was added to 1 kg of the fermentation product. The mixture was further fermented at 35° C. for 3 days to obtain miso. Also, the mixture with no enzyme addition was fermented in the same manner at 35° C. for 3 days to obtain miso containing no enzyme substance. The enzyme substance derived from pig liver was added at 0.01, 0.1, 1 and 10 units, respectively, and Lipase MY at 0.01 and 10 units, respectively, based on 1 kg of the substance fermented at 35° C. for 30 days.

1.5 g of the obtained miso was dissolved in 150 ml of hot water (80° C.), and an organoleptic test was conducted by trained panels to evaluate the quality. The results are shown in Table 5.

TABLE 5

| Item | Enzyme substance in Reference Example 1 (from pig liver) | | | | Not added | Lipase MY | |
|---|---|---|---|---|---|---|---|
| | (0.01) | (0.1) | (1) | (10) | | (0.01) | (10) |
| Ester Flavor | 0.5 | 0.7 | 1.9 | 2.4 | 0.2 | 0 | 0 |
| Waxy smell* | 0 | 0 | 0 | 0 | 0 | 1.8 | 2.4 |
| Grainy smell* | 0.4 | 0 | 0 | 0 | 1.8 | 0 | 0 |
| Number of panels expressing preference | 1 | 3 | 7 | 0 | 2 | 0 | 0 |

Note:
*Average value of panels' evaluation of the strength of the waxy smell and grainy smell, based on the following criteria:
0: Unnoticeable
1: Slightly noticeable
2: Clearly noticeable
3: Very noticeable
(The same method of evaluation was used in the subsequent Table.)

As seen from the table, the miso using the enzyme substance in Reference Example 1 showed an increase in the desirable ester flavor, and a decrease in the grainy smell. On the other hand, the miso using commercially available Lipase MY showed a decrease in the desirable ester flavor, and generated the undesirable waxy smell. Also, no panels like this miso to which Lipase MY was added.

Example 5

Method for the Production of Soy Sauce 5 kg of wheat was roasted in a revolving cylindrical heater to a lightly roasted surface, and the wheat was crushed with a crusher. Separately, 5 kg of defatted soy beans was swelled in hot water to the volume of 120%, and then steamed under pressure of 1 kg/cm$^2$ for 40 minutes. The steamed soy beans were then mixed with the previously crushed wheat. When the temperature of the mixture was brought back to 40° C., the miso seed koji (*Aspergillus oryzae*, Hishiroku) was added thereto and the mixture was cultured in an aerated koji maker at 27° C. for 45 minutes to prepare koji. To the koji was added a saline solution prepared by dissolving 3 kg of salt in 17.3 liters of water. The mixture was fermented at 18° C. for 5 months to obtain moromi. Next, the moromi was squeezed with a bar-compressor to obtain fresh soy sauce. The enzyme substance listed in Table 6 was added to 1 kg of the fresh soy sauce. The mixture was further fermented at 18° C. for 3 days to obtain soy sauce. Also, a mixture with no enzyme substance added was fermented in the same manner at 18° C. for 3 days to obtain soy sauce without the enzyme substance. The enzyme substance derived from cow liver was added at 0.05, 0.5, and 1 unit, respectively, and Lipase LP at 0.05 and 1 unit, respectively, to 1 kg of the soy sauce fermented at 18° C. for 5 months.

1.5 g of the obtained soy sauce was dissolved in 150 ml of hot water (80° C.), and an organoleptic test was conducted by trained panels to evaluate the quality. The results are shown in Table 6.

TABLE 6

| Item | Enzyme substance in Reference Example 3 (from cow liver) | | | Not added | Lipase LP | |
|---|---|---|---|---|---|---|
| | (0.05) | (0.5) | (1) | | (0.05) | (1) |
| Ester flavor | 0.8 | 1.3 | 2.3 | 0.6 | 0 | 0 |
| Waxy smell | 0 | 0 | 0 | 0 | 0.7 | 1.3 |
| Number of panels expressing preference | 3 | 12 | 1 | 2 | 0 | 0 |

As seen from the table, the soy sauce using the enzyme substance in Reference Example 3 showed an increase in the desirable ester flavor. On the other hand, the soy sauce using commercially available Lipase LP showed a decrease in the desirable ester flavor, and generated the undesirable waxy smell. Also, no panels like the soy sauce to which Lipase LP was added.

Example 6

Method for the Production of Sake 60 g of koji rice*$^4$, 1 ml of sake yeast*$^5$ and 0.9 ml of 95% lactic acid were dispersed and mixed in 200 ml of fresh water. The mixture was allowed to stand at 15° C. for 4 hours. 120 g of steamed rice was added thereto and mixed (first addition), and fermentation was carried out at 15° C. for 2 days. Then, 70 g of koji rice, 250 g of steamed rice and 420 ml of fresh water were added thereto (second addition). The mixture was further fermented at 15° C. for 1 day. Finally, 70 g of koji rice, 430 g of steamed rice and 680 ml of fresh water (third addition) were added thereto and mixed. The mixture was further fermented at 15° C. for 12 days.

The enzyme substance (enzyme substance derived from pig liver in Reference Example 1 or Lipase MY) was added during the final addition, and the product was compared to the product produced without enzyme substance. The amounts of enzyme substance added were 0.05, 0.5, 5 and 10 units of the pig liver-derived enzyme substance and 0.05 and 10 units of Lipase MY per 1 kg of moromi.
(Note)

*4 The Aspergillus used was sake koji fungi (*Aspergillus oryzae*).

*5 Sake yeast #9 of the Japan Brewing Society was cultured at 30° C. for 2 days in a YPD medium (1% yeast extract, 1% polypeptone, 2% glucose), and the culture was subjected to centrifugation at 7,000 g for 3 minutes. The supernatant was removed to obtain sake yeast.

The fermented moromi was pressure-filtered to obtain a supernatant. An organoleptic test was conducted to evaluate the quality. The results are shown in Table 7.

TABLE 7

| Item | Not added | Enzyme substance in Reference Example 1 (from pig liver) | | | | Lipase MY | |
|---|---|---|---|---|---|---|---|
| | | (0.05) | (0.5) | (5) | (10) | (0.05) | (10) |
| Ester flavor | 1.2 | 2.0 | 2.5 | 3.2 | 3.7 | 1.2 | 1.4 |
| Aroma*$^6$ | 1.8 | 2.9 | 3.5 | 3.8 | 4.0 | 1.5 | 1.6 |
| Taste*$^6$ | 2.2 | 3.0 | 3.5 | 3.2 | 3.1 | 2.0 | 1.5 |

Note:
*$^6$Average value of panels' evaluation of the aroma (overall evaluation including ester flavor) and taste, based on the following criteria:
1: Very bad

TABLE 7-continued

| Item | Not added | Enzyme substance in Reference Example 1 (from pig liver) | | | | Lipase MY | |
|---|---|---|---|---|---|---|---|
| | | (0.05) | (0.5) | (5) | (10) | (0.05) | (10) |

2: Bad
3: Normal
4: Good
5: Very good
(The same method of evaluation was used in the subsequent Table.)

As seen from the table, the sake using the enzyme substance in Reference Example 1 showed an increase in the desirable ester flavor, in direct relation to the increase in addition of the enzyme substance. On the other hand, the sake using Lipase MY showed no increase in the ester flavor, and the taste and aroma could not be improved.

Example 7

Method for the Production of Shochu 50 ml of sake yeast*7 and 280 g of rice koji*8 were dispersed in 400 ml of fresh water (first addition). The mixture was fermented at 20° C. for 6 days. Next, 560 g of barley and 800 ml of fresh water were added thereto (second addition). The mixture was further fermented at 20° C. for 10 days.

The enzyme substance (pig kidney-derived enzyme substance in Reference Example 2 or Lipase LP) was added during the second addition, and the product was compared to the product produced without enzyme substance.

The enzyme dosages were 0.01, 0.1, 1 and 10 units, respectively, of the pig kidney-derived enzyme substance and 0.01 and 10 units, respectively, of Lipase LP per 1 kg of the moromi.
Note:
*7 Shochu yeast #2 of the Japan Brewing Society was cultured at 30° C. for 24 hours in a YPD medium, and the culture solution was precipitated by gravity at 5° C. for 15 hours. The upper layer was removed to obtain sake yeast.
*8 The Aspergillus used was shochu koji fungi (*Aspergillus oryzae*).

The fermented moromi was distilled at 60° C. under reduced pressure. The moromi was allowed to cool at 5° C. for 4 days, and the oil was removed by filtration. The non-oily moromi was subjected to an organoleptic test.
The results are shown in Table 8.

TABLE 8

| Item | Not added | Enzyme substance in Reference Example 2 (from pig kidney) | | | | Lipase LP | |
|---|---|---|---|---|---|---|---|
| | | (0.01) | (0.1) | (1) | (10) | (0.01) | (10) |
| Ester flavor | 0.8 | 2.1 | 2.5 | 3.3 | 3.9 | 0.7 | 0.8 |
| Aroma | 1.0 | 2.2 | 2.7 | 3.6 | 4.0 | 0.6 | 0.5 |
| Taste | 2.0 | 2.0 | 2.6 | 2.5 | 2.2 | 1.5 | 1.4 |

As shown in the table, when the enzyme substance in Reference Example 2 was added to the shochu, there was an increase in the desirable ester flavor, in direct relation to the increase in addition of the enzyme substance. On the other hand, the shochu using Lipase LP showed no increase in the ester flavor, and the taste and aroma could not be improved.

Example 8

Method for the Production of White Wine

Wine yeast (Japan Brewing Society OC-2) was added to 1 kg of grape juice (verdelet) (50 million yeast cells per 1 kg of juice). Fermentation was carried out at 20° C. for 14 days. The enzyme substance (pig kidney-derived enzyme substance in Reference Example 2, or Lipase LP) was added during the wine yeast addition, and the product was compared to the product produced without enzyme substance.

The amounts of the enzyme substance added were 0.1, 1 and 10 units, respectively, of the pig kidney-derived enzyme substance and 0.1 and 10 units, respectively, of Lipase LP per 1 kg of the moromi.

The fermented wine was subjected to an organoleptic test for evaluation of the quality. The results are shown in Table 9.

TABLE 9

| Item | Not added | Enzyme substance in Reference Example 2 (from pig kidney) | | | Lipase LP | |
|---|---|---|---|---|---|---|
| | | (0.01) | (1) | (10) | (0.1) | (10) |
| Ester flavor | 2.0 | 2.3 | 3.0 | 3.9 | 1.8 | 1.9 |
| Aroma | 2.1 | 2.9 | 3.1 | 4.0 | 2.0 | 1.9 |
| Taste | 2.0 | 2.2 | 2.5 | 3.5 | 1.5 | 1.6 |

As shown in the table, when the enzyme substance in Reference Example 2 was added to the wine, there was an increase in the desirable ester flavor, in direct relation to the increase in addition of the enzyme substance.

On the other hand, the wine using Lipase LP showed no increase in the ester flavor, and the taste and aroma could not be improved.

Example 9

Method for the Production of Sake-like Seasoning (Alcohol-containing Seasoning)

150 g of koji rice*4, 1.5 ml of sake yeast*5 and 1.9 ml of 95% lactic acid were mixed with 380 ml of fresh water. The mixture was allowed to stand at 20° C. for 4 hours. Then 180 g of steamed rice were added thereto and mixed (first addition). Fermentation was carried out at 20° C. for 6 days. Then, 210 g of koji rice, 500 g of steamed rice and 1280 ml of fresh water were added thereto (second addition). The mixture was further fermented at 20° C. for 7 days. On the 8th day, 65 g of salt was added thereto.

The enzyme substance (pig liver-derived enzyme substance in Reference Example 1 or Lipase MY) was added during the second addition, and the product was compared to the product produced without enzyme substance.

The amounts of the enzyme substance added were 0.01, 0.1 and 10 units, respectively, of the pig liver-derived enzyme substance and 0.01 and 10 units, respectively, of Lipase MY per 1 kg of the moromi.
Notes:
*4, *5 The same is applied as in Example 6

The insolubles were removed from the moromi by pressure filtration. The quality was evaluated by an organoleptic test. The results are shown in Table 10.

TABLE 10

| Item | Not added | Enzyme substance in Reference Example 1 (from pig liver) | | | Lipase MY | |
|---|---|---|---|---|---|---|
| | | (0.01) | (0.1) | (10) | (0.01) | (10) |
| Ester flavor | 0.9 | 2.4 | 2.9 | 3.4 | 0.5 | 0.4 |
| Aroma | 1.1 | 2.3 | 3.2 | 3.7 | 1.0 | 0.8 |

As shown in the table, when the enzyme substance in Reference Example 1 was added, there was an increase in the desirable ester flavor in direct relation to the increase in addition of the enzyme substance, providing a flavor-rich product. On the other hand, the product using Lipase MY showed no increase in the ester flavor, and the aroma could not be improved.

Example 10

Method for the Production of Sweet Sake Seasoning (Alcohol-containing Seasoning)

85% refined glutinous rice was immersed in water for 5 hours, and then it was steamed under pressure at 1.2 kg/cm$^2$ for 30 minutes. Then, 260 g of the steamed glutinous rice (steamed rice) and 38 g of koji rice*9 were mixed together. 400 ml of a seasoning liquid*10 was added thereto, and the mixture was saccharified and aged at 30° C. for 30 days.

The enzyme substance (cow liver-derived enzyme substance in Reference Example 3 or Lipase P) was added during the addition of the seasoning, and the product was compared to the product produced without enzyme substance.

The amounts of the enzyme substance added were 0.005, 0.05 and 5 units, respectively, of the cow liver-derived enzyme substance and 0.005 and 5 units, respectively, of Lipase P per 1 kg of the moromi.

Note:
*9 The Aspergillus used was sake koji fungi (*Aspergillus oryzae*).
*10 A mixture of 4% glucose, 17% ethanol (95%), 0.07% lactic acid (90%) and 78.93% water.

The saccharified and aged moromi was centrifuged (7,000 g, 20 minutes) to separate the sake kasu (insolubles), and then an organoleptic test was conducted on the sweet sake. The results are shown in Table 11.

TABLE 11

| Item | Not added | Enzyme substance in Reference Example 3 (from cow liver) | | | Lipase P | |
|---|---|---|---|---|---|---|
| | | (0.005) | (0.05) | (5) | (0.005) | (5) |
| Ester flavor | 0.4 | 1.0 | 1.6 | 2.1 | 0.2 | 0.5 |
| Koji smell*11 | 5.0 | 3.8 | 2.0 | 1.8 | 4.8 | 4.8 |
| Aroma | 2.0 | 2.2 | 2.9 | 3.1 | 1.2 | 1.5 |
| Taste | 2.0 | 3.5 | 3.8 | 2.1 | 1.3 | 1.0 |

Note:
*11 Average value of panels' evaluation of the koji smell, based on the following criteria:
1: Very weak
2: Weak
3: Normal
4: Strong
5: Very strong
(The same method of evaluation was used in the subsequent Table.)

As shown in the table, when the enzyme substance in Reference Example 3 was added to the sweet sake, there was an increase in the desirable ester flavor, in direct relation to the increase in addition of the enzyme substance, while the koji smell decreased. On the other hand, the sweet sake using Lipase P showed no increase in the ester flavor, while there was no decrease in the koji smell. Also, the taste and aroma could not be improved.

Example 11

Method for the Production of Sake 60 g of koji rice, 1 ml of sake yeast and 0.9 ml of 95% lactic acid were mixed in 200 ml of fresh water. The mixture was allowed to stand at 15° C. for 4 hours. 120 g of steamed rice was added thereto and mixed (first addition). Fermentation was carried out at 15° C. for 2 hours. Then, 70 g of koji rice, 250 g of steamed rice and 420 ml of fresh water were added thereto (second addition). The mixture was further fermented at 15° C. for 1 day. Finally, 70 g of koji rice, 430 g of steamed rice and 680 ml of fresh water were added thereto and mixed (third addition). The mixture was further fermented at 15° C. for 12 days.

The enzyme substance (enzyme substance derived from pig liver in Reference Example 1 or derived from pig liver in Reference Example 36) was added during the third addition. The amounts of enzyme substance added were 0.43 units of the pig liver-derived enzyme substance in Reference Example 1 and 0.10 units of the pig liver-derived enzyme substance in Reference Example 36, per 1 kg of moromi. The fermented moromi was subjected to a pressure filter and the resulting liquid was subjected to an organoleptic test to evaluate the quality. The results are shown in Table 12.

TABLE 12

| Item | Enzyme substance in Reference Example 1 (from Pig liver) (0.43) | Enzyme substance in Reference Example 36 (from pig liver) (0.10) |
|---|---|---|
| Ester flavor | 2.3 | 2.3 |
| Aroma | 3.1 | 3.1 |
| Taste | 3.3 | 3.2 |

Example 12

Method for the Production of Ham

Porkloin was cut to pieces of 1 kg each and trimmed. Then, 1000 g of a curing agent having the composition listed in Table 13 was injected therein with a syringe.

TABLE 13

| Ingredient | Weight (g) |
|---|---|
| Ice water | 707.0 |
| Salt | 120.0 |
| Sugar | 60.0 |
| Glucose | 18.0 |
| Lactose | 28.0 |
| Sodium ascorbate | 1.8 |
| Aspro LA (milkprotein: Kyowa Hakko Kogyo Co., Ltd.) | 20.0 |
| Sodium caseinate | 12.0 |
| Sodium erythorbate | 2.0 |
| Sodium nitrite | 2.2 |
| Pepper | 0.8 |
| Nutmeg | 0.2 |
| Polygon C (Chiyoda Chemicals Co.: phosphates) | 28.0 |
| Total | 1,000.0 |

The meat was subjected to a massaging device to disperse the injected curing agent into the meat (15° C., 20 minutes). Then, the meat was cured at 5° C. for 4 days. The cured meat was then stuffed in a casing, and then dried at 5° C. for 40 minutes.

The meat was smoked at 60° C. for 40 minutes using cherry tree twings, and cooked until the center of the meat reached a temperature of 70° C. The obtained ham was cooled in ice water and then allowed to stand at 5° C. for 2 days.

The enzyme substance (pig liver-derived enzyme substance in Reference Example 1 or Lipase MY) was added during the addition of the curing agent, and the product was compared to the product produced without enzyme substance. The amounts of the enzyme substance added were 0.01, 0.1, 1 and 10 units of the pig liver-derived enzyme substance and 0.01 and 10 units of Lipase MY per 1 kg of the porkloin.

The results are shown in Table 14.

TABLE 14

| Item | Not added | Enzyme substance in Reference Example 1 (from pig liver) | | | | Lipase MY | |
|---|---|---|---|---|---|---|---|
| | | (0.01) | (0.1) | (1) | (10) | (0.01) | (10) |
| Aroma | 3.0 | 3.2 | 3.6 | 4.0 | 4.2 | 2.6 | 1.9 |
| Taste | 3.2 | 3.3 | 3.9 | 4.4 | 4.3 | 2.9 | 1.8 |

As shown in the table, the ham using the enzyme substance in Reference Example 1 had an improved aroma and taste. On the other hand, the ham using Lipase MY had no improvement in aroma or taste.

Example 13

Method for the Production of Sausages

A chopper with a 5 mm mesh plate attached was used to mince 8.5 kg of beef back meat and 1.5 kg of pork back fat. To the mincemeat was added a curing agent (393 g) having the composition listed in Table 15. The mixture was allowed to stand at 2° C. for 24 hours. The mixture was minced again using a chopper with a 5 mm mesh plate attached. The cow intestine was filled with the meat to lengths of 7 cm each. Next, the surfaces of the filled sausages were dried at 20° C. for 24 hours, and then smoked at 40° C. (relative humidity 58%) for 10 hours using cherry tree twigs. After smoking was completed, the sausages were cooked until the center temperature reached 65° C. The completed sausages were cooled in ice water and finally allowed to stand at 5° C. for 1 day.

TABLE 15

| Ingredient | Weight (g) |
|---|---|
| Salt | 250 |
| Sodium nitrite | 1 |
| Sodium nitrate | 1 |
| Glucose | 100 |
| Sodium erythorbate | 6 |
| Pepper | 25 |
| Cardamomum | 1 |
| Paprika | 5 |
| Ginger | 2 |
| Coriander | 2 |
| Total | 393 |

The enzyme substance (pig kidney-derived enzyme substance in Reference Example 2 or Lipase P) was added during the addition of the curing agent, and the product was compared to the product produced without enzyme substance. The amounts of the enzyme substance added were 0.1, 1 and 10 units of the pig kidney-derived enzyme substance and 0.1 and 10 units of Lipase P per 1 kg of the minced meat. The results are shown in Table 16.

TABLE 16

| Item | Not added | Enzyme substance in Reference Example 2 (from pig kidney) | | | Lipase P | |
|---|---|---|---|---|---|---|
| | | (0.1) | (1) | (10) | (0.1) | (10) |
| Aroma | 3.2 | 3.5 | 4.0 | 4.1 | 1.5 | 1.6 |
| Taste | 3.1 | 3.9 | 4.8 | 4.8 | 2.0 | 2.1 |

As shown in the table, the sausages using the enzyme substance in Reference Example 2 had an improved aroma and taste. On the other hand, the sausages using Lipase P had no improvement in aroma or taste.

Example 14

Method for the Production of Sausages

A chopper with a 5 mm mesh plate attached was used to mince 8.5 kg of beef back meat and 1.5 kg of pork back fat. To the mincemeat was added the same curing agent (393 g) as used in Example 12, and mixed. To the mixture was added 1.2 g of Diversitech HP (Lactobacillus starter culture: Diversitech Inc.) dissolved in 18.8 g of water, and then the mixture was allowed to stand at 2° C. for 24 hours. The mixture was again minced using a chopper with a 5 mm mesh attached. Cow intestine was filled to lengths of 7 cm each.

After filling was completed, the surfaces of the filled sausages were dried at 20° C. for 24 hours, and then the sausages were smoked at 40° C. (relative humidity 58%) for 10 hours using cherry tree twigs. The sausages were cooked until the temperature of the center reached 65° C. The completed sausages were cooled in ice water and finally allowed to stand at 5° C. for 1 day. The enzyme substance (pig kidney-derived enzyme substance in Reference Example 2 or Lipase P) was added during the addition of the curing agent, and the product was compared to the product produced without enzyme substance. The amounts of the enzyme substance added were 0.1 units of the pig kidney-derived enzyme substance and 0.1 units of Lipase P per 1 kg of the minced meat.

The results are shown in Table 17.

TABLE 17

| Item | Not added | Enzyme substance in Reference Example 2 (from pig kidney) (0.1) | Lipase P (0.1) |
|---|---|---|---|
| Aroma | 3.5 | 3.9 | 1.6 |
| Taste | 3.6 | 4.2 | 1.9 |
| Acidity* | 2.0 | 1.1 | 1.9 |

* Average value of panels' evaluation of the acidity, based on the following criteria:
0: Unnoticeable
1: Slightly noticeable
2: Clearly noticeable
3: Very noticeable
(The same method of evaluation was used in the subsequent Table.)

As shown in the table, the sausages using the pig-kidney derived enzyme substance obtained in Reference Example 2 was reduced acidity, and showed an improvement in taste and aroma. On the other hand, the sausages using Lipase P did not show this effect.

Example 15

Method for the Production of Yoghurt 50 g of dried milk was mixed with 1 kg of milk (8.5% solids containing no fat; 3.6% milk fat) to obtain fresh milk. The fresh milk was heated at 80° C. for 30 minutes. The heated fresh milk was immediately cooled to 30° C., and kept at the same temperature. On the other hand, yoghurt seed bacteria (yoghurt CH1, CHR HANSEN'S Co.) were added to a sterilized 10% defatted dry milk culture medium. Culturing was carried out at 37° C. for 20 hours. The obtained cultured product was added to a sterilized 10% defatted powdered milk culture and cultured at 37° C. for 20 hours (referred to as Culture Process A). Culture Process A was repeated 3 times to obtain a 50 g of a culture (starter). 50 g of the obtained starter was then added to 1 kg of the above mentioned fresh milk, and the mixture was fermented at 30° C. for 6 hours to obtain yoghurt.

The enzyme substance (pig liver-derived enzyme substance obtained in Reference Example 1 or Lipase MY) was added during the addition of the starter, and the product was compared to the product with no enzyme substance added. The amounts of the enzyme substance added were 0.0001, 0.001 and 0.1 unit of the pig liver-derived enzyme substance and 0.0001 and 0.1 unit of Lipase MY per 1 kg of the fresh milk.

The results are shown in Table 18.

TABLE 18

| Item | Not added | Enzyme substance in Reference Example 1 (from pig liver) | | | Lipase MY | |
|---|---|---|---|---|---|---|
| | | (0.0001) | (0.001) | (0.1) | (0.0001) | (0.1) |
| Aroma | 3.0 | 3.0 | 3.6 | 4.0 | 2.0 | 1.5 |
| Taste | 3.2 | 3.0 | 3.9 | 2.9 | 1.9 | 1.0 |
| Acidity | 3.0 | 2.8 | 2.4 | 1.9 | 2.9 | 3.0 |

As shown in the table, the yoghurt using the pig-liver derived enzyme substance obtained in Reference Example 1 was reduced acidity, and showed an improvement in aroma. On the other hand, the yoghurt using Lipase MY did not show this effect.

Example 16

Method for the Production of Cheese

One kg of milk having the same components as in Example 15 was heated at 63° C. for 30 minutes, then immediately cooled to 30° C. and kept at the same temperature to prepare a fresh milk. On the other hand, cheese seed bacteria (CH-Normal 01, CHR HANSEN'S CO.) were added to a sterilized 10% defatted dry milk culture medium. Culturing was carried out at 37° C. for 20 hours. The obtained culture was added to a sterilized 10% defatted dry milk culture medium and cultured at 37° C. for 20 hours (referred to as Culture Process B). Culture Process B was repeated 3 times to obtain a 50 g of a culture (starter). 20 g of the starter was then added to 1 kg of the above mentioned fresh milk, and the mixture was fermented at 30° C. for 2 hours (the acid degree at this time was 0.2). To the mixture was added 0.03 g of rennet (CHR HANSEN'S CO.) dissolved in 2 g of water per 1 kg of fresh milk, and the mixture was stirred and then allowed to stand at 30° C. for 40 minutes. After confirming that the fresh milk coagulated, the curd was cutted into thicknesses of 0.8 cm. Gentle mixing was performed until the product temperature reached 40° C. The curd was scooped out and stuffed into a mould. The mould was subjected to a press-type compressor and allowed to stand at 15° C. for 12 hours. Then 2.0 g of salt was sprinkled on 100 g of the resulting fresh cheese, followed by standing (15° C., 24 hours) until the surface was dried. The cheese was then coated with cheese wax (CHR HANSEN'S CO., 167B red), and aged at a temperature of 15° C. and a humidity of 85% for 3 months.

The enzyme substance (enzyme substance derived from pig kidney in Reference Example 2 or Lipase P) was added on addition of the starter, and the product was compared with the product without enzyme substance. The amounts of enzyme substance added were 0.005, 0.05 and 1 unit of the pig kidney-derived enzyme substance and 0.005 and 1 unit of Lipase P per 1 kg of the fresh milk.

The results are shown in Table 19.

TABLE 19

| Item | Not added | Enzyme substance in Reference Example 2 (from pig kidney) | | | Lipase P | |
|---|---|---|---|---|---|---|
| | | (0.005) | (0.05) | (1) | (0.005) | (1) |
| Aroma | 3.2 | 3.5 | 4.0 | 4.2 | 1.5 | 1.6 |
| Taste | 3.1 | 3.9 | 4.8 | 4.6 | 1.0 | 1.0 |
| Acidity | 1.9 | 1.8 | 1.0 | 0.7 | 2.0 | 2.0 |

As shown in the table, the cheese using the pig-kidney derived enzyme substance obtained in Reference Example 2 was reduced acidity, and showed an improvement in aroma and taste. On the other hand, the cheese using Lipase P did not show this effect.

Example 17

Method for the Production of Koji Pickles

One kg of a koji mixture comprising 2 kg of rice koji, 70 g of salt and 1 kg of water was added to 400 g of radish which had been pickled at 5° C. for 3 days with 2% salt, based on the weight of the vegetable used. (the same shall apply hereinafter). The mixture was pickled at 5° C. for 10 days.

The enzyme substance (pig liver-derived enzyme substance obtained in Reference Example 1 or Lipase MY) was added during pickling, and the product was compared to the non-added product. The amounts of the enzyme substance added were 0.01, 0.1, and 1 unit of the pig liver-derived enzyme substance and 0.01 and 1 unit of Lipase MY per 1 kg of the koji mixture.

The pickled product was taken from the koji mixture, and the attached koji mixture was removed with cheese cloth. An organoleptic test was conducted to evaluate the quality. The results are shown in Table 20.

TABLE 20

| Item | Not added | Enzyme substance in Reference Example 1 (from pig liver) | | | Lipase MY | |
|---|---|---|---|---|---|---|
| | | (0.01) | (0.1) | (1) | (0.01) | (1) |
| Ester flavor | 0.5 | 1.0 | 1.8 | 2.8 | 0.2 | 0.2 |
| Koji smell | 3.0 | 1.3 | 1.0 | 0.5 | 3.2 | 3.1 |
| Grassy smell from vegetables*[12] | 2.5 | 2.2 | 1.8 | 0.6 | 2.3 | 2.0 |
| Aroma | 3.3 | 3.5 | 4.2 | 4.8 | 2.5 | 1.8 |
| Taste | 3.5 | 3.8 | 4.2 | 3.5 | 2.5 | 1.5 |

TABLE 20-continued

|  | Not added | Enzyme substance in Reference Example 1 (from pig liver) | | | Lipase MY | |
|---|---|---|---|---|---|---|
| Item | | (0.01) | (0.1) | (1) | (0.01) | (1) |

Note: *[12]Average value of panels' evaluation of the grassy smell, based on the following criteria:
0: Unnoticeable
1: Slightly noticeable
2: Clearly noticeable
3: Very noticeable
(The same method of evaluation was used in the subsequent Table.)

As shown in the table, the koji pickles using the enzyme substance in Reference Example 1 had an increased ester flavor, reduced koji smell and improved aroma and taste. Also, the grassy smell from the vegetable (radish) was decreased. On the other hand, the koji pickles using commercially available Lipase MY had a decreased ester flavor, and no improvement in the aroma or taste.

Example 18

Method for the Production of Sake Kasu Pickles

One kg of sake kasu mixture comprising 1.2 kg of sake kasu (pressed-cake from sake production), 60 ml of shochu (alcohol level 35) and 24 g of salt was aged at 30° C. for 2 weeks. The aged sake kasu mixture was used as the pickling bed. To the bed, was added 400 g of white melon which had been pre-pickled with 15% salt at 10° C. for 3 months, and had been washed with running water overnight for desalting, and pickling was performed at 10° C. for 20 days. The kasu solids were removed from the pickled melon, and put in an equal amount of pickling bed having the same composition as described above, which had been aged at 30° C. for 1 month. The melon was further pickled at 10° C. for 20 days.

The enzyme substance (enzyme substance derived from pig kidney in Reference Example 2 or Lipase LP) was added during the second pickling, and the pickled melon was compared with the product produced without enzyme substance. The amounts of enzyme substance added were 0.0005, 0.005, 0.05 and 1 unit of the pig kidney-derived enzyme substance and 0.0005 and 1 unit of Lipase LP per 1 kg of pickling bed.

The pickled product was taken from the pickling bed, and the adhered kasu solids were removed with cheese cloth. An organoleptic test was conducted to evaluate the quality. The results are shown in Table 21.

TABLE 21

| | Not added | Enzyme substance in Reference Example 2 (from pig kidney) | | | | Lipase LP | |
|---|---|---|---|---|---|---|---|
| Item | | (0.0005) | (0.005) | (0.05) | (1) | (0.0005) | (1) |
| Ester flavor | 2.0 | 2.2 | 2.8 | 3.0 | 3.0 | 1.8 | 1.0 |
| Aroma | 3.2 | 3.5 | 3.9 | 4.0 | 4.5 | 1.0 | 1.0 |
| Taste | 3.0 | 3.6 | 4.8 | 4.0 | 3.0 | 1.0 | 1.0 |

As shown in the table, the sake kasu pickles using the enzyme substance in Reference Example 2 had an increased ester flavor, and an improvement in aroma and taste. On the other hand, the pickles using commercially available Lipase LP had a decrease in ester flavor and no improvement in taste or aroma.

Example 19

Method for the Production of Bran Pickles

One kg of rice bran was roasted to light brown, cooled to room temperature and then mixed with 500 g of unroasted rice bran. Further, 430 g of salt and 1.5 kg of water were added thereto and 200 g of cucumbers was pickled in the mixture. Adequate mixing was done once a day. Every other day all the cucumbers were removed and 200 g of fresh cucumbers was pickled. This procedure was repeated at 20° C. for 2 months to obtain aged bran pickling bed. The bran bed was mixed well, 300 g of fresh cucumbers was added thereto and pickled at 20° C. for 1 day. The enzyme substance (enzyme substance derived from pig liver in Reference Example 1 or Lipase LP) was added to the aged bran pickling bed during pickling of the cucumbers, and the pickled cucumbers were compared with the product produced without enzyme substance. The amounts of enzyme substance added were 0.005, 0.05, 0.5 and 5 units of the pig liver-derived enzyme substance and 0.005 and 5 units of Lipase LP per 1 kg of the aged bran pickling bed.

The produced rice bran pickles were taken from the pickling bed, and the adhered bran was removed with cheese cloth. An organoleptic test was conducted to evaluate the quality. The results are shown in Table 22.

TABLE 22

| | Not added | Enzyme substance in Reference Example 1 (from pig liver) | | | | Lipase LP | |
|---|---|---|---|---|---|---|---|
| Item | | (0.005) | (0.05) | (0.5) | (5) | (0.005) | (5) |
| Ester flavor | 1.0 | 1.8 | 2.2 | 2.5 | 2.7 | 0.5 | 0.6 |
| Grassy smell from vegetables | 2.2 | 1.5 | 1.0 | 0.9 | 0.9 | 2.3 | 2.5 |
| Aroma | 3.0 | 3.3 | 3.4 | 4.0 | 4.2 | 2.0 | 1.8 |
| Taste | 3.0 | 3.5 | 3.9 | 3.6 | 3.2 | 1.1 | 1.0 |

As shown in the table, the bran pickles using the enzyme substance in Reference Example 1 had an increased ester flavor with a simultaneous decrease in the grassy smell from the vegetable. Also, the aroma and taste were improved. On the other hand, the bran pickles using commercially available Lipase LP had a decrease in ester flavor and no improvement in grassy smell, aroma or taste.

Example 20

Method for the Production of Vinegar Pickles 360 ml of vinegar, 80 g of salt, 800 g of sugar, 20 ml of sweet sake, 4 g of citric acid, 0.4 g of succinic acid, 30 g of sodium glutamate and 10 g of potassium sorbate were dissolved in 1l of water. Water was further added until the total volume was 2l, and the solution was used as the vinegar pickling bed. Ginger was cut into strips and pre-pickled with 3% salt at 5° C. for 7 days. Then 2.2 kg of the resulting ginger was pickled in the vinegar pickling bed at 5° C. for 2 days.

The enzyme substance (enzyme substance derived from cow liver in Reference Example 3 of Lipase P) was added during addition of the ginger, and the pickled ginger was compared with the product without enzyme substance. The amounts of enzyme substance added were 0.0005, 0.005, 0.05 and 1 unit of the cow liver-derived enzyme substance and 0.0005 and 1 unit of Lipase P per 1 kg of the vinegar pickling bed.

The pickled ginger was taken from the pickling bed, and an organoleptic test was conducted to evaluate the quality.

The results are shown in Table 23.

TABLE 23

| Item | Not added | Enzyme substance in Reference Example 3 (from cow liver) | | | | Lipase P | |
|---|---|---|---|---|---|---|---|
| | | (0.0005) | (0.005) | (0.05) | (1) | (0.0005) | (1) |
| Ester flavor | 1.1 | 1.2 | 1.9 | 2.0 | 2.5 | 1.0 | 0.9 |
| Acidity | 3.0 | 3.0 | 2.0 | 1.8 | 1.8 | 3.0 | 3.0 |
| Aroma | 3.0 | 3.1 | 4.2 | 4.5 | 4.5 | 2.8 | 2.8 |
| Taste | 3.0 | 3.0 | 3.8 | 3.5 | 3.2 | 2.6 | 2.5 |

As shown in the table, the vinegar pickles using the enzyme substance in Reference Example 3 had an increased ester flavor and a simultaneous decrease in acidity. Also, the aroma and taste were improved. On the other hand, the vinegar pickles using commercially available Lipase P had no increase in ester flavor and no improvement in acidity, aroma or taste.

Example 21

Method for the Production of Miso Pickles

Miso pickling bed was prepared by mixing 1 kg of miso, 400 ml of sweet sake and 50 g of sugar. Into the bed was put 1.2 kg of cucumbers which had been pickled with 2% salt at 5° C. for 10 days, and the cucumbers were further pickled at 20° C. for 5 days.

The enzyme substance (enzyme substance derived from pig liver in Reference Example 1 or Lipase MY) was added on the pickling in the miso bed. The pickled cucumbers were compared with the product produced without enzyme substance. The amounts of enzyme substance added were 0.005, 0.05, 0.5 and 5 units of the pig liver-derived enzyme substance and 0.005 and 5 units of Lipase MY per 1 kg of the miso pickling bed. The produced miso pickles were taken from the pickling bed, and the adhered miso was removed with cheese cloth. An organoleptic test was conducted to evaluate the quality. The results are shown in Table 24.

TABLE 24

| Item | Not added | Enzyme substance in Reference Example 1 (from pig liver) | | | | Lipase MY | |
|---|---|---|---|---|---|---|---|
| | | (0.005) | (0.05) | (0.5) | (5) | (0.005) | (5) |
| Ester flavor | 0.5 | 0.8 | 1.4 | 1.8 | 2.0 | 0 | 0 |
| Aroma | 3.1 | 3.5 | 3.7 | 4.0 | 4.5 | 1.0 | 0.7 |
| Taste | 3.5 | 3.7 | 4.0 | 3.5 | 3.2 | 0.5 | 0.2 |

As shown in the table, the miso pickles using the enzyme substance in Reference Example 1 had an increased ester flavor, and the aroma and taste were improved. On the other hand, the miso pickles using commercially available Lipase MY had no ester flavor and exhibited a deterioration in aroma and taste.

Example 22

Method for the Production of Korean Pickles (Kimchi)

The ingredients of the Korean pickles (Kimchi) are shown in Table 25.

TABLE 25

| Chinese cabbage | 1,000 (g) |
|---|---|
| Garlic | 5 |
| Ginger | 5 |
| Red pepper | 10 |
| Salted fish guts | 2 |
| Sugar | 10 |
| Salt | 30 |
| Refined glutinous rice flour | 5 |
| Water | 50 |
| Total | 1,117 |

Process:

The refined glutinous rice flour was dissolved in water by heating. The red pepper was sliced, and the garlic and ginger were grated. The Chinese cabbage was deleafed one by one and 3% salt was added thereto, and the leaves were pickled at 5° C. for 3 days, under pressure equaling the weight of the pickled ingredients. The garlic, red pepper, sugar, salt and salted fish guts were mixed in a refined glutinous rice flour solution which had been pre-cooled to room temperature. The Chinese cabbage leaves were then placed into this mixture and salt was uniformly distributed between each cabbage leaves. The pickling was done at 10° C. for 3 weeks.

The enzyme substance (enzyme substance derived from cow kidney in Reference Example 4 or Lipase P) was added on the start of the pickling, and the pickled cabbage was compared with the product produced without enzyme substance. The amounts of enzyme substance added were 0.005, 0.05, 0.5 and 5 units of the cow kidney-derived enzyme substance and 0.005 and 5 units of Lipase P per 1 kg of the pickled product. The Korean pickles were drained slightly. An organoleptic test was conducted to evaluate the quality. The results are shown in Table 26.

TABLE 26

| Item | Not added | Enzyme substance in Reference Example 4 (from cow kidney) | | | | Lipase P | |
|---|---|---|---|---|---|---|---|
| | | (0.005) | (0.05) | (0.5) | (5) | (0.005) | (5) |
| Garlic smell*[13] | 3.0 | 2.8 | 2.5 | 2.2 | 1.9 | 3.2 | 3.0 |
| Aroma | 3.0 | 3.0 | 3.2 | 3.5 | 3.8 | 3.0 | 3.2 |
| Taste | 3.0 | 3.0 | 3.0 | 3.5 | 3.9 | 2.8 | 2.9 |

Note:
*[13]Average value of panels, evaluation of the garlic smell, based on the following criteria:
0: Unnoticeable
1: Slightly noticeable
2: Clearly noticeable
3: Very noticeable As shown in the table, the Korean pickles using the enzyme substance in Reference Example 4 had a decreased garlic smell, and an improvement in aroma and taste in direct relation to the amount of enzyme substance added. On the other hand, the Korean pickles using commercially available Lipase P had no improvement in garlic smell, taste or aroma.

Example 23

Method for the Production of Sauerkraut

Fresh cabbage was deleafed one by one, washed with water, and dried for 10 days in a shaded, well-ventilated place.

Wilted cabbage was sliced and sprinkled with 2% (on the basis of dried cabbage) salt, and a weight equal to the weight of the cabbage was applied. The cabbage was allowed to stand at 15° C. for 30 days.

The enzyme substance (enzyme substance derived from pig liver in Reference Example 1 or Lipase MY) was added on the start of the sprinkling. The resulting cabbage was compared with the product produced without enzyme substance. The amounts of enzyme substance added were 0.005, 0.05, 0.5 and 5 units of the pig liver-derived enzyme substance and 0.005 and 5 units of Lipase MY per 1 kg of the cabbage.

The sauerkraut was drained slightly. An organoleptic test was conducted to evaluate the quality. The results are shown in Table 27.

TABLE 27

| Item | Not added | Enzyme substance in Reference Example 1 (from pig liver) | | | | Lipase MY | |
|---|---|---|---|---|---|---|---|
| | | (0.005) | (0.05) | (0.5) | (5) | (0.005) | (5) |
| Ester flavor | 0.9 | 1.0 | 1.3 | 1.6 | 2.0 | 0.5 | 0.3 |
| Acidity | 2.8 | 2.8 | 2.5 | 2.2 | 1.8 | 2.9 | 2.0 |
| Aroma | 3.2 | 3.3 | 3.5 | 3.7 | 3.8 | 2.0 | 1.8 |
| Taste | 3.5 | 3.5 | 4.0 | 4.1 | 3.8 | 1.9 | 1.7 |

As shown in the table, the sauerkraut using the enzyme substance in Reference Example 1 had an increased ester flavor and a simultaneous decrease in acidity. Also, the aroma and taste were improved. On the other hand, the sauerkraut using commercially available Lipase MY had a decrease in ester flavor and no improvement in aroma or taste.

Reference Example 1

One kg of pig liver was minced with meat grinder, and then 3,000 ml of a 0.02M phosphate buffer solution (pH 6.5) containing 0.25M sucrose was added thereto and mixed. The mixture was subjected to centrifugation (10,000×g, 30 minutes). The resulting supernatant was adjusted to a pH of 5.3 with 2N acetic acid, allowed to stand at 4° C. for 10 hours, and centrifuged again (10,000×g, 30 minutes) to obtain a precipitate. To the precipitate was added 1,000 ml of cooled acetone (−20° C.), and the mixture was stirred and subjected to vacuum filtration (Toyo Roshi No. 2). The defatting procedure with acetone was repeated 3 times, and then the obtained residue was dried at 20° C. in a vacuum drier to remove the remaining acetone. To the dried substance was added 1,000 ml of a 0.05M phosphate buffer solution (pH 6.7), and stirring was done at 4° C. for 10 hours followed by centrifugation (10,000×g, 30 minutes) to obtain a supernatant. Ammonium sulfate was then added to 50% saturation, and then the mixture was allowed to stand at 4° C. for 5 hours. The mixture was then centrifuged (10,000×g, 30 minutes), and the precipitate was removed. Ammonium sulfate was added thereto to 70% saturation. The mixture was allowed to stand at 4° C. for 5 hours. The solution was again centrifugated (10,000×g, 30 minutes) and 3.2M ammonium sulfate was added to the resulting precipitate until the total volume was 100 ml, and the mixture was used as the enzyme substance derived from pig liver. The ester-synthesizing activity of the pig liver-derived enzyme substance at this time was 0.37 units/mg of protein (0.5% ethanol concentration in the reaction system).

Reference Examples 2–5

In the same manner as in Reference Example 1, the enzyme substance was prepared from pig kidney, cow liver, cow kidney or cow heart instead of pig liver. The enzyme substance has the levels of ester-synthesizing activity (0.5% ethanol concentration in the reaction system) shown in Table 28.

TABLE 28

| Reference Example | Source of enzyme | Ester-synthesizing activity (units/mg of protein) |
|---|---|---|
| 2 | Pig kidney | 0.35 |
| 3 | Cow liver | 0.37 |
| 4 | Cow kidney | 0.35 |
| 5 | Cow heart | 0.29 |

Reference Example 6

Shochu yeast (Japan Brewing Society) was cultured in 10 ml of a YM medium (composition: 10 g of glucose, 5 g of peptone, 3 g of yeast extract, 3 g of malt extract, 1 liter of distilled water: sterilized at 120° C. for 20 minutes in an autoclave) at 30° C. for 24 hours. The culture was transferred to a 1 liter YM medium and further cultured at 30° C. for 24 hours.

The obtained culture was separated by centrifugation (10,000×g, 30 minutes) into cells (precipitate) and supernatant A. The obtained cells were added to 200 ml of sterilized distilled water, mixed with each other, centrifuged (10,000×g, 30 minutes), and the resulting supernatant was discarded. The procedure was repeated once and the obtained cells were washed. 50 ml of a 0.1M phosphate buffer solution (pH 6) were then added to the washed cells. The cells were disrupted with a homogenizer (B. Braun Co.), and then filtered with a 0.2 µm membrane filter (Toyo Roshi Co.) to remove the intact cells from the solution. Ammonium sulfate was added thereto to 70% saturation and mixed with each other. Then, the resulting mixture was allowed to stand at 4° C. for 5 hours. The precipitate obtained by centrifugation (10,000×g, 30 minutes) of the mixture was then dissolved in 3.2M ammonium sulfate until the total volume of the solution was 5 ml, and the solution was used as the enzyme substance from the cells.

Also, the obtained supernatant A was filtered with a 0.2 µm membrane filter to remove the cells which could not be removed by centrifugation. Then, ammonium sulfate was added thereto to 70% saturation and mixed with each other. The solution was allowed to stand at 4° C. for 5 hours. The precipitate obtained by centrifugation (10,000×g, 30 minutes) of the solution was then dissolved in 3.2M ammonium sulfate until the total volume of the solution was 5 ml. The resulting solution was used as the enzyme substance from supernatant A.

Reference Examples 7–12

In the same manner as in Reference Example 6, miso yeast, soy sauce yeast (Japan Brewing Society), baker's yeast (Daiya yeast), sake yeast (Japan Brewing Society No. 7), sake yeast (Japan Brewing Society No. 9) or wine yeast (Japan Brewing Society OC No. 2) were used instead of the shochu yeast, to obtain enzyme substance solutions from cells and from supernatant A.

Reference Examples 13–16

*Aspergillus oryzae* IFO 30104, *Aspergillus awamori* IFO 4033, *Aspergillus sojae* ATCC 16320 or *Botrytis cinerea* IFO 5881 was cultured in 10 ml of a YM medium at 30° C.

for 24 hours. The obtained culture was transferred to a 1 liter YM medium and further cultured at 30° C. for 72 hours. The obtained culture was separated by centrifugation (10,000×g, 30 minutes) into cells (precipitate) and supernatant B. Then, proceeding in the same manner as in Reference Example 6, the enzyme substance was obtained from the cells and from supernatant B.

Reference Examples 17–22

*Lactococcus lactis* subsp. lactis ATCC 15346, *Lactococcus lactis* subsp. lactis IFO 3434, *Lactococcus lactis* subsp. cremoris 71593 AHU 1175, *Lactobacillus plantarum* ATCC 21028, *Lactobacillus casei* IFO 3425 or *Lactobacillus species* IFO 3914 was cultured in 10 ml of a general lactobacillus inoculation culture medium, at 30° C. for 24 hours. The culture was transferred to a 1 liter general lactobacillus inoculation culture medium, and further cultured at 30° C. for 24 hours. The obtained culture was separated by centrifugation (10,000 ×g, 30 minutes) into cells (precipitate) and supernatant C. Then, the enzyme substance was obtained from the cells and from supernatant C according to the same procedures as in Reference Example 6.

Reference Examples 23–35

Lipase M, Lipase F, Lipase A, Lipase P, Lipase MY, Lipase Au, Lipase LP, Palatase M, Neurase F, Talipase, Pancreatic lipase 250, Lipase 400 or Lipase 600 was dissolved in a 0.1M phosphate buffer solution (pH 6), and then centrifuged (10,000×g, 30 minutes). The obtained solution was then filtered with a 0.2 μm membrane filter, and used as the enzyme substance.

Reference Example 36

The enzyme substance obtained in Reference Example 1 was further purified by the following method.

To 350 ml of the enzyme substance obtained in Reference Example 1 was added 3,150 ml of deionized water, and the mixture was adequately stirred. The enzyme substance was heated to 50° C. with boiling water while stirring, and allowed to stand at 50° C. for 1 hour. Then, the enzyme substance was placed in ice water and centrifuged (10,000× g, 30 minutes). The insoluble matters which were coagulated during heating were precipitated as a result of the centrifugation. Ammonium sulfate was added to the resulting supernatant to 70% saturation, thoroughly dissolved, and allowed to stand at 4° C. for 4 hours. The solution was further subjected to centrifugation (10,000×g, 30 minutes) to recover the enzyme substance as a precipitate, which was kept at 4° C. as a 3.2M ammonium sulfate suspension.

To 4 ml of the enzyme substance was added 100 mM boric acid buffer (pH 8.0) containing 0.1M salt. The solution was subjected to gel filtration chromatography using a Sephacryl S-300HR (Pharmacia Co.) which had been equilibrated with 100 mM boric acid buffer. The column used had an internal diameter of 26 mm and a length of 80 cm, and the flow rate was 5 ml/min. The obtained active fractions were collected and again ammonium sulfate solution was added thereto to 70% saturation and the mixture was subjected to centrifugation (10,000×g, 30 minutes).

Next, 10 ml of the enzyme substance was dialyzed for 15 minutes against a 50 mM Tris-HCl buffer (pH 8.0). The obtained desalted enzyme substance was subjected to a DEAE Sepharose Fast Flow (Pharmacia Co.) which had been equilibrated with the same Tris-HCl buffer as mentioned above, and was eluted with a 0–250 mM NaCl gradient. The obtained active fractions were collected, and ammonium sulfate was added thereto to 70% saturation. The mixture was subjected to centrifugation (10,000×g, 30 minutes). Then, the precipitate was kept at 4° C. as a suspension in 3.2M ammonium sulfate (protein content 12.3 mg/ml). The specific activity of the obtained enzyme substance was 1.59 units/mg of protein (0.5% ethanol concentration in the reaction system). The enzyme substance exhibited a single band at a molecular weight of about 180,000, in polyacrylamide gel electrophoresis at 4–12% concentration.

We claim:

1. A method for imparting ester flavor to a food or beverage comprising bringing an animal-organ derived ester-synthesizing enzyme having a potency of at least 0.1 unit/mg protein into contact with the food or beverage to impart a flavor during a production process of the food or beverage.

2. The method according to claim 1, wherein the production process includes a fermentation step, and an ester-synthesizing enzyme substance is added during said fermentation step.

3. The method according to claim 2, wherein said fermentation step involves fermentation with yeast.

4. The method according to claim 2, wherein said fermentation step involves fermentation with lactobacilli.

5. The method according to claim 1, wherein the ester-synthesizing activity of the ester-synthesizing enzyme substance is 30 or higher when 0.5% (w/w) ethanol and 2.6% (w/w) butyric acid are used as substrates, defining the ester synthesis activity when 5% (w/w) ethanol and 2.6% (w/w) butyric acid are used as the substrate, as 100.

6. The method according to claim 1, wherein the animal is a pig, cow, horse or goat.

7. The methods according to claim 1, wherein the ester-synthesizing enzyme is derived from the liver, kidney or heart of an animal.

8. The method according to claim 1, wherein the food or beverage is bread, a brewer's seasoning, alcohols, an alcohol-containing seasoning, processed meat, a dairy product or a pickled product.

9. A method according to claim 1, wherein the enzyme potency is measured under conditions where ethyl butyrate is synthesized by reacting 0.5% (w/w) ethanol with 2.6% (w/w) butyric acid.

* * * * *